US012667892B2

(12) United States Patent (10) Patent No.: US 12,667,892 B2
Hoppe et al. (45) Date of Patent: Jun. 30, 2026

(54) DEVICE AND METHOD FOR PRODUCING A THREE-DIMENSIONAL WORKPIECE

(71) Applicant: Nikon SLM Solutions AG, Lübeck (DE)

(72) Inventors: Birk Hoppe, Lübeck (DE); Kevin Kondziella, Lübeck (DE); Toni Adam Krol, Lübeck (DE); Christopher Stengel, Lübeck (DE); Meike Husmann, Lübeck (DE); Naveed Iqbal, Lübeck (DE); Maximilian Schniedenham, Lübeck (DE); Dieter Schwarze, Lübeck (DE); Jan Wilkes, Lübeck (DE); Bärbel Kratz, Lübeck (DE)

(73) Assignee: Nikon SLM Solutions AG, Lübeck (DE)

( * ) Notice: Subject to any disclaimer, the term of this patent is extended or adjusted under 35 U.S.C. 154(b) by 991 days.

(21) Appl. No.: 17/432,740

(22) PCT Filed: Mar. 2, 2020

(86) PCT No.: PCT/EP2020/055395
§ 371 (c)(1),
(2) Date: Aug. 20, 2021

(87) PCT Pub. No.: WO2020/178220
PCT Pub. Date: Sep. 10, 2020

(65) Prior Publication Data
US 2022/0055115 A1 Feb. 24, 2022

(30) Foreign Application Priority Data
Mar. 4, 2019 (DE) ..................... 10 2019 105 397.8

(51) Int. Cl.
*B22F 12/41* (2021.01)
*B22F 10/28* (2021.01)
(Continued)

(52) U.S. Cl.
CPC ............ *B22F 12/41* (2021.01); *B22F 10/322* (2021.01); *B22F 12/10* (2021.01); *B22F 12/13* (2021.01);
(Continued)

(58) Field of Classification Search
CPC ........ B22F 10/28; B22F 10/322; B22F 10/77; B22F 12/10; B22F 12/13; B22F 12/22;
(Continued)

(56) References Cited

U.S. PATENT DOCUMENTS 9,956,612 B1 5/2018 Redding et al.
2003/0222961 A1* 12/2003 Nakajima ............ C09D 11/101
347/102
(Continued)

FOREIGN PATENT DOCUMENTS

CN 104798451 7/2015
CN 107008900 8/2017
(Continued)

OTHER PUBLICATIONS

European Patent Office, International Search Report and Written Opinion for International Application No. PCT/ EP2020/055395, Apr. 2, 2020.
(Continued)

*Primary Examiner* — Philip C Tucker
*Assistant Examiner* — Jimmy R Smith, Jr.
(74) *Attorney, Agent, or Firm* — Williams Mullen; Thomas F. Bergert

(57) ABSTRACT
We describe a process chamber, an apparatus, a modular system, a method, a safety device, a positioning system and
(Continued)

a system for producing a three-dimensional workpiece and/or for use thereof when producing a three-dimensional workpiece. The process chamber for producing the three-dimensional workpiece via an additive layer construction method comprises: a material supply unit comprising a substantially ring-like shaped end portion at a first side of the process chamber, wherein the material supply unit is adapted to supply, via the end portion, material to a carrier on which the material is to be processed by the process chamber for producing the three-dimensional workpiece, and an opening at the first side of the process chamber for processing, by the process chamber, the material supplied on the carrier in order to produce the three-dimensional workpiece, wherein the substantially ring-like shaped end portion surrounds the opening.

15 Claims, 26 Drawing Sheets

(51) Int. Cl.

| | |
|---|---|
| *B22F 10/322* | (2021.01) |
| *B22F 10/77* | (2021.01) |
| *B22F 12/00* | (2021.01) |
| *B22F 12/10* | (2021.01) |
| *B22F 12/13* | (2021.01) |
| *B22F 12/30* | (2021.01) |
| *B22F 12/49* | (2021.01) |
| *B22F 12/50* | (2021.01) |
| *B22F 12/55* | (2021.01) |
| *B22F 12/57* | (2021.01) |
| *B22F 12/60* | (2021.01) |
| *B22F 12/70* | (2021.01) |
| *B22F 12/80* | (2021.01) |
| *B22F 12/84* | (2021.01) |
| *B22F 12/90* | (2021.01) |
| *B33Y 10/00* | (2015.01) |
| *B33Y 30/00* | (2015.01) |
| *B33Y 40/00* | (2020.01) |

(52) U.S. Cl.
   CPC .............. *B22F 12/22* (2021.01); *B22F 12/38* (2021.01); *B22F 12/50* (2021.01); *B22F 12/55* (2021.01); *B22F 12/57* (2021.01); *B22F 12/60* (2021.01); *B22F 12/70* (2021.01); *B22F 12/80* (2021.01); *B22F 12/84* (2021.01); *B33Y 10/00* (2014.12); *B33Y 30/00* (2014.12); *B33Y 40/00* (2014.12); *B22F 10/28* (2021.01); *B22F 10/77* (2021.01); *B22F 12/30* (2021.01); *B22F 12/49* (2021.01); *B22F 12/90* (2021.01)

(58) Field of Classification Search
   CPC ........ B22F 12/226; B22F 12/30; B22F 12/38; B22F 12/41; B22F 12/49; B22F 12/50; B22F 12/55; B22F 12/57; B22F 12/60; B22F 12/70; B22F 12/80; B22F 12/84; B22F 12/90; B22F 2999/00; B33Y 10/00; B33Y 30/00; B33Y 40/00; B33Y 50/02; Y02P 10/25; B29C 64/25

See application file for complete search history.

(56) References Cited

U.S. PATENT DOCUMENTS

| | | | |
|---|---|---|---|
| 2005/0038551 A1 | 2/2005 | Mazumder et al. | |
| 2014/0175708 A1 | 6/2014 | Echigo et al. | |
| 2014/0374935 A1 | 12/2014 | Flitsch et al. | |
| 2016/0059350 A1* | 3/2016 | Schoenleber | B23K 26/04 |
| | | | 219/121.81 |
| 2016/0136731 A1 | 5/2016 | McMurtry et al. | |
| 2017/0050268 A1* | 2/2017 | Fujiya | B23K 26/342 |
| 2018/0281068 A1* | 10/2018 | Redding | B22F 10/00 |
| 2018/0311727 A1 | 11/2018 | Willmann | |
| 2019/0039299 A1* | 2/2019 | Busbee | B29C 64/209 |

FOREIGN PATENT DOCUMENTS

| | | |
|---|---|---|
| CN | 107696479 | 2/2018 |
| CN | 107708895 | 2/2018 |
| CN | 108349161 | 7/2018 |
| DE | 202005007140 | 9/2006 |
| DE | 102014218639 | 3/2016 |
| DE | 102014221501 | 4/2016 |
| DE | 102017205027 | 9/2018 |
| EP | 2835249 | 2/2015 |
| EP | 3735330 | 11/2020 |
| JP | 5355213 | 11/2013 |
| TW | 201726363 | 8/2017 |
| WO | 2016109550 | 7/2016 |
| WO | 2018073816 | 4/2018 |
| WO | 2018132283 | 7/2018 |
| WO | 2019048022 | 3/2019 |
| WO | 2020/178220 A1 | 9/2020 |

OTHER PUBLICATIONS

German Patent and Trademark Office, German Search Report for Application No. 10 2019 105 397.8, Dec. 19, 2019.

Chinese National Intellectual Property Administration, First Office Action for CN Patent Application No. 202080019020.7, Oct. 25, 2022.

European Patent Office, European Search Report for International Patent Application No. EP 24 155 486.4, Apr. 29, 2024.

European Patent Office, Extended Search Report, European Patent Application No. 25158741.6, May 26, 2025.

China National Intellectual Property Administration, Office Action, Chinese Patent Application No. 202310714401.2, Feb. 14, 2026.

H. Qiu; "Study of Molding Process and Application of 3D Printing Technology;" China Plastics; vol. 30; No. 11; pp. 76-83; Nov. 2016.

* cited by examiner

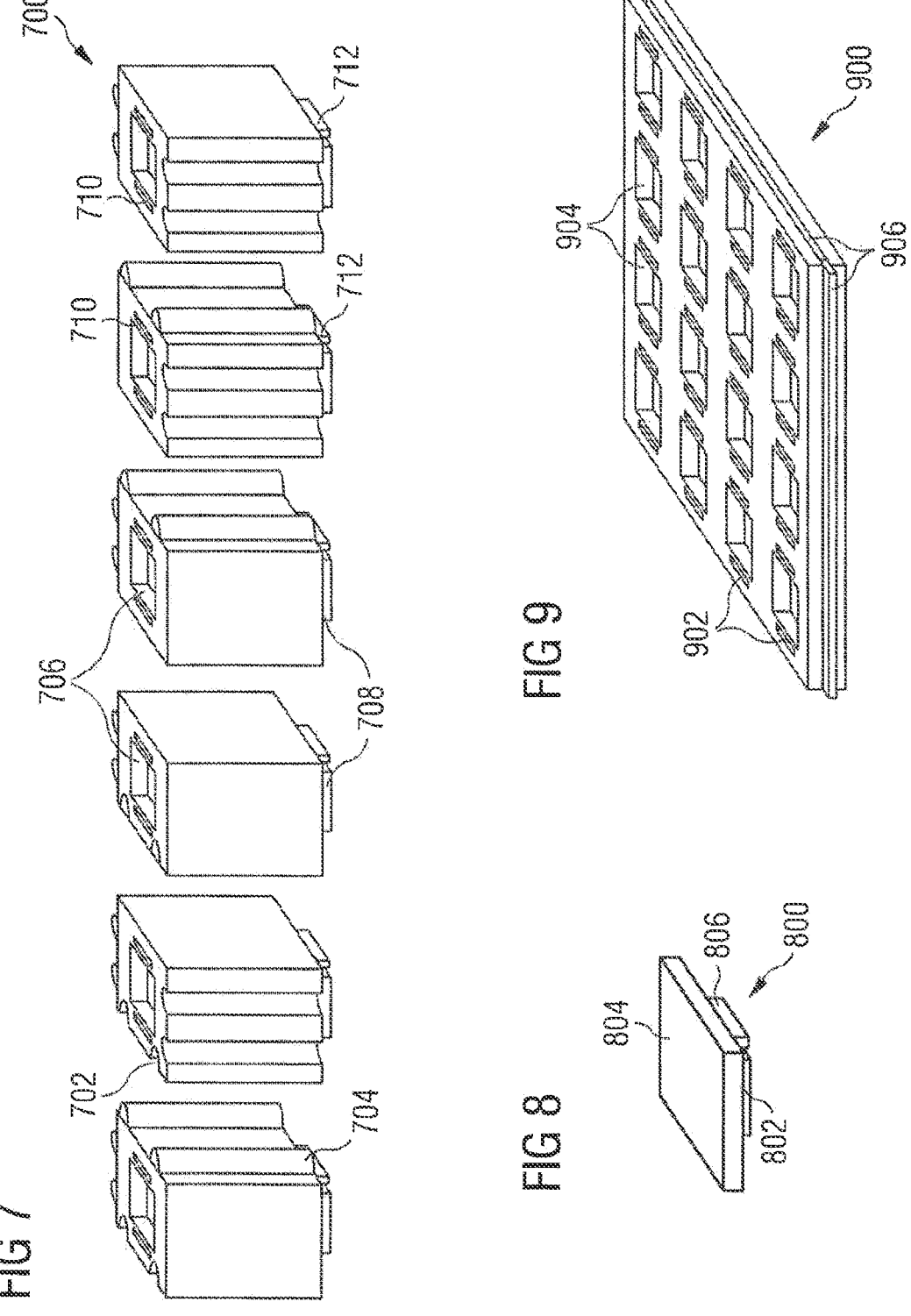

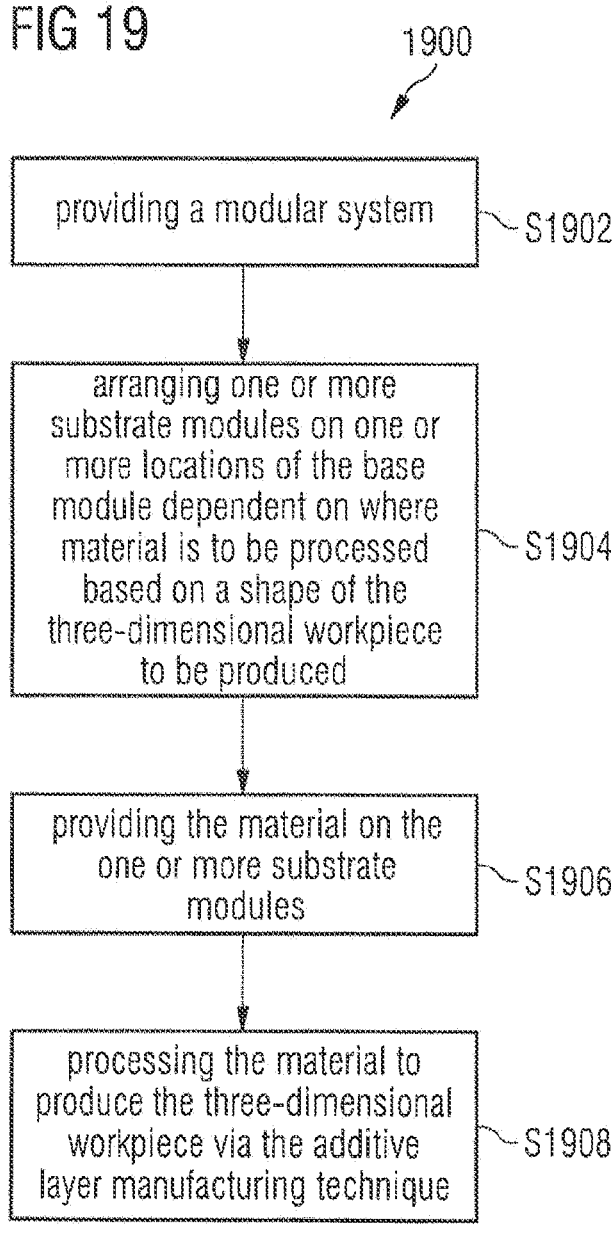

providing a modular system ⟋S1902 arranging one or more substrate modules on one or more locations of the base module dependent on where material is to be processed based on a shape of the three-dimensional workpiece to be produced ⟋S1904 providing the material on the one or more substrate modules ⟋S1906 processing the material to produce the three-dimensional workpiece via the additive layer manufacturing technique ⟋S1908

$p_1 = x > p_0$
-> Laser OK $p_0$ $p_1 down$
-> Laser /
Roboter STOP $p_0$

FIG 21
Laser OK
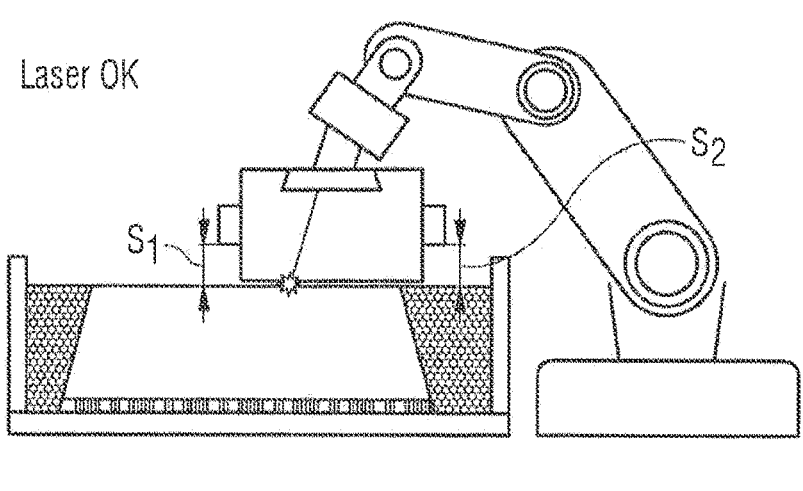
Laser STOP
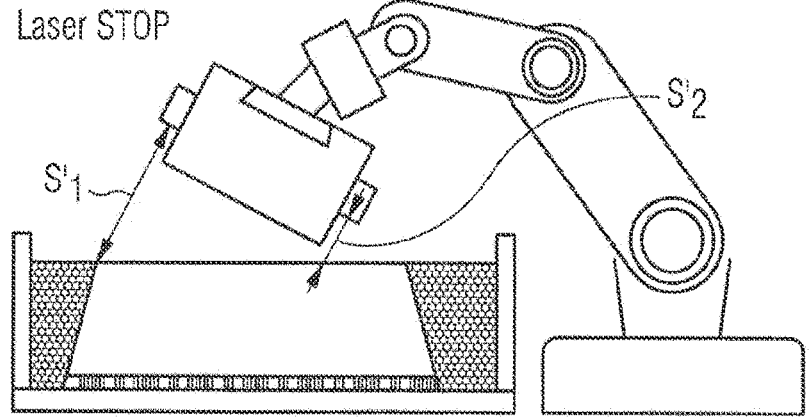

FIG 28
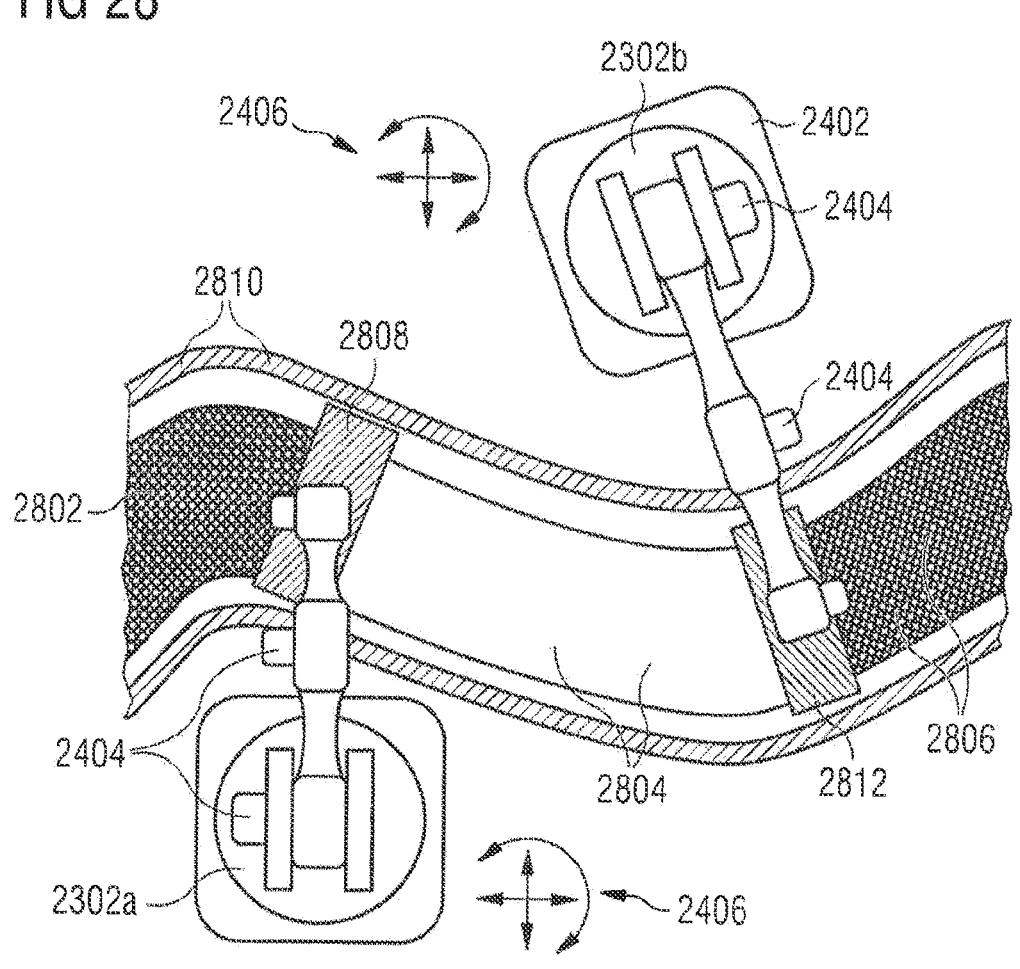

DEVICE AND METHOD FOR PRODUCING A THREE-DIMENSIONAL WORKPIECE

CROSS-REFERENCE TO RELATED APPLICATIONS

This application is the U.S. national phase of international application PCT/EP2020/055395, filed on Mar. 2, 2020, which claims the benefit of German application DE 10 2019 105 397.8 filed on Mar. 4, 2019; all of which are hereby incorporated herein in their entirety by reference.

The present invention generally relates to a process chamber, an apparatus, a modular system, a method, and in particular a safety device and a positioning system comprised in the apparatus, and a system for producing a three-dimensional workpiece and/or for use thereof when producing a three-dimensional workpiece.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser radiation in a site selective manner in dependence on the desired geometry of the workpiece that is to be produced. The laser radiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopaedic prostheses, on the basis of CAD data.

On the other hand, fused deposition modeling or material jetting represent different types of additive layering processes. In this case, non-solidified raw material is supplied to a type of printing head which deposits said material onto a carrier where it then solidifies.

An important parameter of additive layer construction methods is the quality of the produced workpieces. Moreover, production efficiency is crucial, e.g. in the sense of keeping production cycles as short as possible. For example, numerous strategies are known for speeding up the production of single workpiece layers. However, when producing large workpieces, known solutions do not always achieve the desired efficiency and/or quality.

Therefore, it is an object of the present invention in particular to improve efficiency during the additive layer production of (in particular large) workpieces while maintaining a sufficient level of quality.

The invention is set out in the independent claims. Preferred embodiments of the invention are outlined in the dependent claims.

We describe an apparatus for producing a three-dimensional workpiece via an additive layer construction method, the apparatus comprising: a carrier adapted to receive material for producing the three-dimensional workpiece; a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of: a gas flow device adapted to form a flow of gas above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber.

In some examples, the process chamber comprises the material supply unit; the material supply unit comprising an, in particular substantially ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening.

The process chamber generally as described throughout the present disclosure with regard to various example implementations may relate to a movable process chamber. This may allow in particular producing large workpieces, whereby the process chamber is moved to different positions in order to process the material from which the workpiece is to be produced.

The substantially ring-like shape of the end portion, as applicable according to some implementations, may hereby, in some examples, comprise a substantially circularly shaped end portion, a substantially elliptically shaped end portion or a substantially oval shaped end portion.

The end portion being substantially ring-like shaped may allow for supplying the material onto the carrier from said ring-like shaped portion, i.e. the material is not supplied from a central location encompassed by the end portion, but only from an edge area where the end portion is arranged.

The first side of the process chamber may relate to a bottom side of the process chamber.

The opening at the first side of the process chamber may, in some examples, comprise a substantially circular opening.

It may be particularly advantageous to provide a material supply unit which comprises a substantially ring-like shaped end portion at a first side of the process chamber, from which end portion material is supplied onto a carrier on which the material is to be processed by the process chamber for producing the three-dimensional workpiece. This is because a ring-like shaped end portion from which the material is supplied onto the carrier may allow supplying the material onto the carrier in an omnidirectional manner, in particular without a preferential direction of movement of the process chamber over the carrier during which movement the material is supplied onto the carrier. A ring-like shaped end portion may hereby be preferable over, for example, a rectangular end portion, as in the latter case a uniform distribution of the material onto the carrier from all parts of the end portion may not be achievable in particular at any corners of such a rectangular end portion. This may result in irregularities when supplying a layer of the material onto the carrier, which may be avoided when using a ring-like shaped end portion.

As outlined above, furthermore, a ring-like shaped end portion prevents there being a preferential direction when moving the process chamber over the carrier.

The material to be supplied onto the carrier by the material supply unit may, in some examples, be a pulverulent material, in particular a metallic and/or ceramic raw material. In some examples, the material may be supplied onto the carrier by printing the material, using, for example, a printing head which deposits the material onto the carrier where it then solidifies (for example automatically upon or subsequent to the deposition of the material onto the carrier) or is to be solidified subsequently using other means, such as a solidification device which may solidify the material using, for example, a radiation (for example laser) or a particle beam.

Throughout the present disclosure, the process chamber may be a movable process chamber.

In some examples, the material supply unit comprises a bell-like shaped structure through which the material is suppliable to the carrier, and wherein the end portion forms an end part of the bell-like shaped structure.

The bell-like shape of the structure may hereby refer to the material supply unit tapering from the first side of the process chamber to a second side of the process chamber which is opposite to the first side. The tapering from the first side to the second side may hereby comprise a first degree of tapering followed by a second degree of tapering, whereby the second degree of tapering of the material supply unit is higher (i.e. the material supply unit tapers faster) than the first degree of tapering. The different degree of tapering results in the bell-like shape of the structure.

In some examples, the tapering may be negligible or go to zero at the end portion of the material supply unit. In other words, when the process chamber is placed on the carrier, the material supply unit may allow supplying the material to the carrier via the end portion which is aligned substantially perpendicularly to the carrier.

In some examples, a container storing the material may be provided, whereby the material may then be provided from the container to the material supply unit prior to being supplied to the carrier via the end portion. Given the bell-like shape of the material supply unit, material may be supplied to the carrier throughout different sections of the end portion in a uniform manner. This may be achieved, in particular, due to the dead weight of the material when being arranged within the bell-like shaped material supply unit, resulting in a uniform distribution of the material within the bell-like shaped material supply unit, and in particular within the end portion from which the material is to be supplied to the carrier. Advantageously, any irregularities of the material supplied to the carrier may be avoided or reduced.

In some examples, the process chamber comprises a multi-wall structure, and wherein a first cavity formed between a first wall and a second wall of the multi-wall structure is comprised in or coupled to the material supply unit. The multi-wall structure may be open at the first side of the process chamber (i.e. the site on which the opening of the process chamber is provided).

Providing the multi-wall structure may be particularly advantageous as no material supply unit which is separate from a wall structure of the process chamber may be needed and the material may be provided to the carrier by the material supply unit in a well-defined, uniform manner based on the shape of the multi-wall structure of the process chamber.

We further describe an apparatus, in particular as outlined above in which the process chamber comprises a multi-wall structure, for producing a three-dimensional workpiece via an additive layer construction method, the process chamber comprising a gas extraction unit and/or gas introduction unit, wherein a second cavity is formed between a third wall and a fourth wall of the multi-wall structure, wherein the second cavity is arranged radially outwards from the first cavity in a direction away from a center portion of the process chamber, and wherein the second cavity is comprised in or coupled to the gas extraction unit and/or gas introduction unit which is configured to extract and/or introduce, respectively, gas from the center portion of the process chamber. This may be particularly advantageous as shielding gas may be extracted from the interior of the process chamber, whereby the second cavity provides for a sealing effect. Furthermore, by providing a second cavity between a third wall and a fourth wall of the multi-wall structure, whereby the second cavity is comprised in or coupled to the gas extraction unit, extracting gas, such as the shielding gas, from the interior of the process chamber may not influence a layer of material which has already been deposited onto the carrier and which may be processed in order to produce the three-dimensional workpiece prior to the walls of the process chamber reaching said material when the process chamber is moved over the carrier. Additionally or alternatively, providing a gas extraction unit and/or gas introduction unit may be particularly advantageous as they may be used in order to adjust and/or equalize the pressure in the process chamber.

In some examples, the second wall is integral to (i.e. is identical to) the third wall.

In some examples, a third cavity is formed between a fifth wall and a sixth wall of the multi-wall structure, and wherein process (for example shielding) gas is introducible into and/or extractable out of the process chamber via the third cavity. The third cavity may be formed based on inside walls of the process chamber.

The fifth wall and/or the sixth wall may be integral (i.e. identical to) any of the above-identified walls of the multi-wall structure.

In some examples, the solidification device comprises a radiation (for example laser) and/or particle source. In some examples, the solidification device may comprise an optical module like, for example, a beam steering optic comprising one or more deflectable mirrors. It is understood that the process chamber may comprise an optical module arranged at the process chamber and a radiation source distant to the process chamber connected via a radiation conductor. When referred to the process chamber comprising the solidification device, this means that the process chamber can also comprise only an optical module for directing radiation to the material.

Providing both of the material supply unit and the solidification device in the process chamber may advantageously allow for relatively fast deposition and solidifying of the material on top of the carrier.

In some examples, the solidification device is generally arranged parallel to the opening at the first side of the process chamber.

In some examples, the solidification device is offset from a center axis of the process chamber, wherein the center axis is defined as being perpendicular to a plane defined by the opening of the process chamber and running through a central point of the opening. The solidification device may hereby, in some examples, be tilted with respect to the opening of the process chamber (and/or with respect to the carrier onto which the material to be processed is supplied).

Providing the solidification device which is offset from a center axis of the process chamber may be particularly advantageous when the material supply unit comprises a bell-like shaped structure, to which material to be processed for producing the three-dimensional workpiece may be provided via a container arranged above the process chamber. The offset of the solidification device with respect to the center axis of the process chamber may hereby allow centrally arranging such a container above the solidification device, which may ensure a symmetrical material supply from the container to the material supply unit, thereby enabling a uniform material distribution within the material supply unit, and in particular the end portion thereof. This may allow for providing the material from the end portion to the carrier in a uniform manner along the entire circumference of the end portion.

In some examples, the layer depositing mechanism is arranged at the first side of the process chamber and adapted to form the supplied material into the material layer on top of the carrier. The layer depositing mechanism may hereby allow for smoothening out of the material deposited by the material supply unit on the carrier. In some examples, the layer depositing mechanism comprises a layer depositing lip and/or a layer depositing brush and/or a layer depositing blade.

In some examples, the layer depositing mechanism is arranged adjacent to (that is directly next to or within a small distance from) and radially inwards from (i.e. towards a center of the process chamber) the first cavity for controlling, via the layer depositing mechanism, supplying the material to the carrier via the first cavity. That means that the layer depositing mechanism may be arranged between the end portion of the material supply unit and the opening at the first side of the process chamber.

This may be particularly advantageous as the layer depositing mechanism may also be used in order to prevent an undesired flowing out of the material from the material supply unit. This may be achieved via a clamping effect which may arise in a gap between the layer depositing mechanism and the first cavity due to a large number of contact points between the particles of the material. Furthermore, the material which may be clamped in this gap may also prevent a gas from exiting the process chamber.

In some examples, the apparatus further comprises a first seal arranged at the first side of the process chamber and between the end portion and the opening for producing, in use of the process chamber, a first gas vortex. This may be particularly advantageous as the first gas vortex may allow for reducing process (shielding) gas leakage from an interior of the process chamber. A gas extraction may be arranged radially outwards from the first seal, such that gas, which may have traveled from the inside of the process chamber and through the particles provided in the first cavity of the material supply unit, may be extracted by a defined vacuum.

In some examples, the apparatus further comprises a second seal arranged at the first side of the process chamber and radially outwards from the second cavity. The second seal may hereby be arranged directly next to the second cavity or may be arranged within a predefined distance from the second cavity. The second seal may cause, during use of the process chamber, an additional gas vortex to occur, which may advantageously prevent too much gas from a surrounding of the process chamber to be extracted via the gas extraction which is arranged radially outwards from the first seal.

In some examples, the apparatus further comprises a third seal arranged at the first side of the process chamber and radially outwards from the end portion of the material supply unit for producing, in use of the process chamber, a second gas vortex.

Each of the gas vortices may slow down a gas stream insofar that only a reduced gas stream may occur between the different zones of the process chamber. The zones may hereby be defined as being separated by the first and second seals, and by the different cavities and the interior of the process chamber.

In some examples, the material supply unit comprises a material feed geometry which is adapted to homogeneously distribute, in the end portion of the material supply unit, the material to be supplied to the carrier. The material feed geometry may hereby comprise a cylindrical shape, a triangular shape or a free-form shape. The material feed geometry is adapted to provide the same or substantially same height of the material along the entire circumference of the material supply unit. This may advantageously allow for enabling the same or substantially same pressure conditions along the entire circumference of the material supply unit and in particular the end portion of the material supply unit. This may enable a uniform distribution when supplying the material onto the carrier when the process chamber is moved in particular in different directions over the carrier.

In some examples, the apparatus further comprises a ring-like shaped sieve coupled or integral to the material supply unit, wherein the sieve is adapted to homogeneously distribute, in the end portion of the material supply unit, the material to be supplied to the carrier. This may further allow for uniform distribution of the material along the entire circumference of the material supply unit and in particular in the end portion.

In some examples, the first cavity comprises a segmentation for providing different material via different sections of the end portion to the carrier. In some examples, the segmentation may result in two to four sections. As will be appreciated, another number of sections due to the segmentation may be provided. The supply of the material by the material supply unit to the carrier may be an omnidirectional supply and, in some examples, the (shielding) gas stream within the process chamber may be changed, such that, due to movement of the process chamber over the carrier, supplying of the material to the carrier may hereby occur. The segmentation may advantageously allow for supplying different material to the carrier during a material supply procedure. This may be achieved, for example, by the process chamber being moved over the carrier in a certain direction and the material, which is arranged in a section which is placed at the side of the process chamber in which the process chamber is moving, being supplied to the carrier. Additionally or alternatively, the process chamber may be rotated in a certain direction which allows for depositing material stored in a particular one (or more) of the sections.

Therefore, in some examples, a section of the different sections of the end portion from which the material is suppliable to the carrier is dependent from a direction of movement of the process chamber over the carrier. This may allow for a simple change of the material which is to be supplied to the carrier at a particular area of the carrier.

In some examples of the apparatus, a first material having particles of a first size is suppliable to the carrier via a first section of the different sections and a second material having particles of a second size, which is different from the first size, is suppliable to the carrier via a second section of the different sections, wherein the second section is different from the first section.

Different materials may therefore be provided on different areas of the carrier, whereby the materials may be used for different purposes. In some examples, a material may be used in order to produce the three-dimensional workpiece. Alternatively or additionally, in some examples, a different material may be used to fill a certain volume over the carrier, whereby this material is not to be processed in order to produce the three-dimensional workpiece. Alternatively or additionally, in some examples, a particular material may be used for isolating (for example thermally isolating and/or electrically isolating) purposes.

In some examples of the apparatus in which the process chamber comprises the gas flow device, the gas flow device is arranged at a first side of the process chamber and comprises a process gas introduction unit and a process gas extraction unit (for example a process gas suction unit) arranged oppositely of each other at for introducing and extracting process (for example shielding) gas into and out of the process chamber (to flow over the carrier), respectively, and wherein the apparatus further comprises a moving mechanism adapted to change a position of the process gas introduction unit and the process gas extraction unit at the first side of the process chamber. This may be particularly advantageous in view of an omnidirectional supply and solidification procedure of the material deposited onto the carrier. The moving mechanism may hereby change the position of the process gas introduction unit and the process gas extraction unit along the end portion of the material supply unit. The process gas introduction unit and the process gas extraction unit may each hereby be arranged radially inwards of the end portion of the material supply unit.

In some examples, the gas flow device may comprise one or more nozzles as a gas flow introduction unit in particular for introducing the gas substantially unidirectionally above the surface area of the material layer that is to be solidified. The gas flow device may also comprise, for example, one or more flow straighteners for establishing a laminar unidirectional flow.

In some examples, the apparatus further comprises a substantially circular structure comprising recesses, wherein the structure is arranged radially inwards from the process gas introduction unit and the process gas extraction unit towards a center portion of the process chamber, and wherein the structure comprising recesses is adapted to guide the process gas from the process gas introduction unit to the process gas extraction unit. In some examples, the apparatus further comprises substantially semi-circular segments configured to cover the recesses at positions where the process gas is prevented from entering an interior portion of the process chamber. The semi-circular segments may be rotated in a plane parallel to the opening of the process chamber such that the direction of the gas stream may be adjusted, and in particular adjusted dynamically. In some examples, the process chamber may hereby be moved in all directions during a material supply and/or solidification process, whereby the gas stream may, in some examples, be adjusted to continuously be opposite to a direction of movement of the process chamber over the carrier. The (substantially) circular shape may hereby comprise a (substantially) elliptical shape or a (substantially) oval shape.

In some examples, the apparatus further comprises a particle collector adapted to collect particles of the material supplied on the carrier, but which particles are not comprised in the three-dimensional workpiece to be produced. The particles not comprised in the three-dimensional workpiece to be produced may hereby relate, for example, to splashes stemming in particular from the solidification process but were ejected during said solidification process. The particle collector may comprise a scoop plate. In some examples, the particle collector may be arranged in a sickle-like manner and horizontally in front of and radially inwards from the process gas extraction unit. The particle collector may hereby collect in particular oxide particles, too large particles and other residue stemming from the additive manufacturing process. These particles and residue may be removed from the particle collector by rotating the process chamber to tilt the particle collector in particular in an area distinct from an area in which the material is deposited onto the carrier for producing the three-dimensional workpiece.

As outlined above, in some examples, the particle collector is arranged adjacent to (i.e. directly next to or within a certain distance) and radially inwards from the process gas extraction unit. The particle collector may hereby, in some examples, be movable (in particular rotatable parallel to a plane of the opening of the process chamber) together with the gas extraction unit and/or gas introduction unit. The particle collector may additionally or alternatively be arranged adjacent to the gas introduction unit.

In some examples, the apparatus further comprises a process gas filter (i) arranged adjacent to (i.e. directly next to or within a certain distance) and radially inwards from the process gas extraction unit and/or (ii) integral to the process gas extraction unit. The process gas filter may hereby be arranged, in some examples, directly above the particle collector. The gas filter may advantageously allow for filtering small particles and/or material (for example powder) deposits and/or condensate from the process gas directly at the process chamber. A further filter external to the process chamber may therefore be redundant.

We further describe a process chamber, in particular as outlined according to one or more of the examples above, for producing a three-dimensional workpiece via an additive layer construction method, the process chamber comprising a heating unit (for example radiant heating unit or irradiation unit) arranged (i) within an interior portion of the process chamber and/or (ii) contiguously to (i.e. next to and sharing a common border with) or adjacent to (i.e. next to and having a gap between the heating unit and) the ring-like shaped end portion of the material supply unit radially inwards and/or radially outwards from the ring-like shaped end portion of the material supply unit, wherein the heating unit (for example radiant heating unit or irradiation unit) is adapted to heat up the material supplied on the carrier. The heating unit (for example radiant heating unit or irradiation unit) may, in some examples, have a circular or substantially circular shape. The (substantially) circular shape may hereby comprise a (substantially) elliptical shape or a (substantially) oval shape. The heating unit (for example radiant heating unit or irradiation unit) may, in some examples, be aligned coaxially with a center axis of the process chamber, wherein the center axis is defined as being perpendicular to a plane defined by the opening of the process chamber and running through a central point of the opening. This may advantageously allow for homogeneous (or gradient) heating (in particular pre-heating prior to solidification and/or post-heating after solidification) of the material processed to produce the three-dimensional workpiece. The heating unit (for example radiant heating unit or irradiation unit) may, in some examples, comprise one or more of: one or more infrared light sources, one or more laser diodes, one or more vertical-cavity surface-emitting lasers, one or more UV light sources, one or more LEDs, other types of lasers and one or more inductive heating devices.

The heating unit(s) may be used in order to, for example, pre-heat the material (for example metal powder) prior to solidification (for example using laser sintering or laser melting) in order to: increase the temperature level so as to be able to reduce the voltage supply for driving the solidification device, and/or dry the material (for example powder), and/or increase adhesion forces between the material (for example powder) particles (sinter columns) in order to passivate the reactive material and/or reduce turbulence and flow of the material outside of the process chamber and/or reduce smoke or particle transport within the process chamber (in particular in a laser melting process) and/or reduce the material cone for producing the three-dimensional workpiece since the resulting powder deposit may enable steeper material cone angles in the production direction of the three-dimensional workpiece.

In some examples, the heating unit (for example radiant heating unit or irradiation unit) is movable within the interior portion of the process chamber. In particular, the heating unit (for example radiant heating unit or irradiation unit) may be movable, in some examples, in a circular manner within the interior portion of the process chamber.

In some examples, the process chamber further comprises one or more ducts for arranging one or more sensors at a periphery of the process chamber for obtaining processing parameters during use of the process chamber to produce the three-dimensional workpiece. This may be particularly advantageous as the processing parameters may be adjusted during or after the process in particular of forming a single layer of the three-dimensional workpiece using the additive layer construction method.

We further describe an apparatus for producing a three-dimensional workpiece via an additive layer construction method, the apparatus comprising a carrier adapted to receive material for producing the three-dimensional workpiece via the additive layer construction method; the process chamber according to any one of the examples as described herein; and a moving unit (or an additional external moving device between a main positioning unit and the process chamber) adapted to move the process chamber relative to the carrier to position the process chamber oppositely to different sections of the carrier.

We further describe an apparatus as outlined above, comprising: the process chamber comprising one or more ducts, and the one or more sensors which are adapted to sense a position of the process chamber relative to the carrier, wherein the apparatus is adapted to generate a sensor signal based on the sensed position of the process chamber relative to the carrier, and wherein the moving unit is adapted to move the process chamber relative to the carrier based on the sensor signal. This may advantageously allow for improving the position on the carrier at which the material is to be supplied and/or at which the material is to be solidified by the process chamber.

The moving unit may, for example, comprise a cartesian robot, a six-axis robot, a seven-axis robot, a SCARA robot or a parallel manipulator as a hexapod.

We further describe a modular system for use with the process chamber or the apparatus as outlined above, wherein the modular system comprises: a (for example substantially flat) base module comprising one or more first elements (for example one or more recesses and/or one or more protrusions) on a surface of the base module; one or more substrate modules for receiving, on a first surface of a said substrate module, material to be processed for producing a three-dimensional workpiece via an additive layer construction method, wherein a said substrate module comprises one or more second elements (for example one or more recesses and/or one or more protrusions) on a second surface of the substrate module, wherein the first surface is opposite to the second surface, wherein protrusion said second element is shaped to mate with a said first element of the base module for a temporary fixation of the base module with the one or more substrate modules; and one or more modular elements for (i) supporting the material when being received by the one or more substrate modules and/or (ii) confining the material in an area on the one or more substrate modules and/or (iii) supporting the substrate module, wherein a said modular element comprises one or more third elements (for example one or more recesses and/or one or more protrusions), wherein a said third element is shaped to mate with a said first element of the base module for a temporary fixation of the one or more modular elements on the base module. The modular system may hereby allow for flexibility during the process of producing the three-dimensional workpiece. In particular, supporting the material when being received by the one or more substrate modules may allow for compensating for certain forces acting on the processed material during the manufacturing process. Confining the material in an area on the one or more substrate modules may allow for reducing the amount of material needed that is to be supplied to the carrier prior to the material being processed for producing the three-dimensional workpiece. Supporting the substrate module may equally in particular allow for reducing the amount of material needed that is to be supplied to the carrier prior to the material being processed for producing the three-dimensional workpiece.

We further describe a system comprising the apparatus according to one or more of the example implementations as described herein and the modular system according to one or more of the example implementations as described herein.

In some examples, the base module and/or the one or more substrate modules comprise one or more sealable openings for receiving the one or more modular elements, and wherein the one or more modular elements are raisable for said supporting of the material and/or said confining of the material and/or supporting of the one or more substrate modules depending on a state (for example building height) of said producing of the three-dimensional workpiece via the additive layer construction method. Adjusting the height of the modular elements may allow for reducing the amount of material needed to produce a three-dimensional workpiece as the modular elements can be raised depending on a production height of the three-dimensional workpiece.

In some examples, the modular system comprises a first and a second said base module, wherein the first base module comprises a base module protrusion and the second base module comprises a base module recess shaped to mate with the base module protrusion for temporarily fixing the first base module and the second base module to each other. This may advantageously allow for providing a larger area on which the three-dimensional workpiece is to be produced.

We further describe a method for producing a three-dimensional workpiece via an additive layer manufacturing technique, the method comprising providing a modular system as outlined according to one of the examples above; arranging the one or more substrate modules on one or more locations of the base module dependent on where material is to be processed based on a shape of the three-dimensional workpiece to be produced; providing the material on the one or more substrate modules, in particular using the process chamber or the apparatus as outlined herein according to one of the described examples; and processing the material to produce the three-dimensional workpiece via the additive layer manufacturing technique.

In some examples, the method further comprises providing the one or more modular elements on one or both of (i) one or more of the one or more first elements of the base module and (ii) one or more of the one or more substrate modules to: support the material when being provided on the one or more substrate modules, and/or confine the material, when being provided on the one or more substrate modules, in an area on the one or more substrate modules, and/or support a said substrate module for subsequently receiving the material by the substrate module.

In some examples, the method further comprises arranging a said modular element on top of a previously arranged modular element dependent on an increased building height of the three-dimensional workpiece produced via the additive layer manufacturing technique.

In some examples, the method further comprises providing a displacement material, prior to providing the material from which the three-dimensional workpiece is produced, in a predefined volume confined by the modular system. This may further allow for reducing the amount of material which is needed in order to produce the three-dimensional workpiece.

We further describe a safety control device for use with the process chamber according to one of the examples as described in which the process chamber comprises a solidification device, wherein the safety control device comprises: a sensor adapted to sense a state of the process chamber and/or of an enclosure in which the process chamber is arranged, and a control unit adapted to control the solidification device, wherein the control unit is coupled to the sensor, and wherein the control unit is adapted to prevent releasing radiation and/or particles (when the solidification device comprises a particle source) stemming from the solidification device and/or to switch off the solidification device upon the sensor sensing that the state satisfies a predefined condition. The safety control device may therefore advantageously allow for reducing or eliminating any danger to a human being which may stem from radiation and/or particles released from the solidification device.

In some examples, the predefined condition comprises the opening of the process chamber not being covered (for example by the carrier). The solidification device may be prevented from releasing radiation and/or may be switched off when the opening of the process chamber is not covered.

In some examples, the opening of the process chamber not being covered comprises the process chamber being lifted (for example from the carrier on which the material to be processed to produce the three-dimensional workpiece using the additive layer manufacturing technique, and/or from one or more components or parts of the modular system according to example implementations as described herein) from the carrier and/or an orientation of the process chamber changing relative to the carrier.

The orientation of the process chamber changing relative to the carrier may hereby relate to a tilting of the process chamber.

In some examples, the sensor comprises an accelerometer. The accelerometer may be used in order to determine when the orientation of the process chamber changes relative to the carrier.

In some examples, the sensor comprises a pressure sensor adapted to sense a pressure change in the enclosure in which the process chamber is arranged, and wherein the predefined condition comprises the pressure change. In particular, it may be determined that the pressure within the enclosure decreases, which may be due to the enclosure being opened, upon which the solidification device may be prevented from releasing radiation and/or may be switched off. Additionally or alternatively, it may be determined that the pressure within the enclosure increases, which may be due to the enclosure being closed and the opening of the process chamber not being covered while gas is introduced into the enclosure by, for example, a gas introduction unit of the process chamber. Upon a pressure increase in the enclosure, the solidification device may be prevented from releasing radiation and/or particles, and/or may be switched off.

In some examples, the safety control device further comprises a door switch coupled to the control unit, wherein the door switch is adapted to detect when a door of the enclosure in which the process chamber is arranged is open, and wherein the predefined condition comprises the door being open. Therefore, whenever a human were to enter the enclosure, the solidification device may be prevented from releasing radiation and/or particles, and/or the solidification device may be switched off.

In some examples, the control unit is coupleable to a robotic device operating within the enclosure, and in particular coupleable to the moving unit as outlined above, wherein the control unit is adapted to control or affect a movement or movement capability of the robotic device, and in particular the moving unit, upon the door switch detecting that the door of the enclosure is open. Affecting a movement capability of the robotic device may comprise reducing a maximum speed with which the robotic device may move and/or preventing the robotic device from being able to move to certain locations which may theoretically be reachable by the robotic device due to its physical dimensions. As a result, a human entering the enclosure may be prevented from being contacted by the robotic device.

In some examples, the sensor comprises a distance sensor adapted to determine a distance between the process chamber and the carrier, and wherein the predefined condition comprises exceeding a minimum distance between the process chamber and the carrier upon which the control unit prevents releasing radiation and/or partides stemming from the solidification device and/or switches off the solidification device. This may further improve safety for any human which may enter the enclosure in which the process chamber is operated.

In some examples, the safety control device further comprises a processing unit adapted to determine when, based on a reflection of the radiation (and/or particles) stemming from the solidification device off the carrier, the radiation can exit from a volume confined by the process chamber, and wherein the predefined condition comprises the radiation being able to exit said volume. This may further improve safety for any human which may enter the enclosure in which the process chamber is operated.

In some examples, the sensor is arranged on the process chamber. This may be particularly advantageous in order to determine the state of the process chamber. In particular, in examples where the sensor comprises a distance sensor, the distance between the process chamber and the carrier may be precisely determined.

We further describe a positioning system, in particular wherein the positioning system is comprised in or coupled to the apparatus as described herein according to one or more of the outlined examples, wherein the positioning system comprises: one or more positioning units adapted to be arranged at defined positions of an edge region of the carrier; and one or more measuring sensors adapted to be arranged on the process chamber and/or at defined locations with respect to the process chamber (for example on a moving unit for moving the process chamber); wherein the position of the process chamber is determinable and/or correctable by the positioning system based on signals of the measuring sensor or the measuring sensors. In some examples, the positioning units and the measuring sensors are shaped to receive each other. The positioning system therefore allows for precisely determining a position of the process chamber, such that the position where the material for producing the three-dimensional workpiece is to be supplied onto the carrier and/or the position where the material is to be solidified may be precisely determined. This may be particularly advantageous when, for example, temperature fluctuations or other erroneous processing parameters may need to be compensated during the production of the three-dimensional workpiece.

The positioning system may, in some examples, be used for determining and/or correcting positions of a plurality of process chambers.

In some examples, a said positioning unit comprises three plates, each of the plates being arranged perpendicularly to both of the other plates to form an arrangement with two open sides and an open top, and wherein the position of the process chamber is determinable and/or correctable based on one or more of the measuring sensors contacting respective one or more plates of a said positioning unit. This may allow for determining and/or correcting the position of the process chamber in all three dimensions.

In some examples, the positioning system is configured to determine an inclination of the process chamber relative to the carrier based on three measuring sensors contacting corresponding, respective plates of a said positioning unit. The orientation of the process chamber may hereby be determined and/or corrected. In some examples, it may hereby be determined on which location on a positioning unit, for example on which location on a wall of the positioning unit, a measuring sensor contacts the positioning unit. Additionally or alternatively, in particular six measuring sensors may be used in order to determine the inclination of the process chamber relative to the carrier.

The contacting may hereby, according to some examples, relate to a tactile contacting.

In some examples, the one or more positioning units are raisable in a direction perpendicular to a said carrier. This may be particularly advantageous as one or more of the one or more positioning units may be raised or lowered depending on the state of the production of the three-dimensional workpiece, e.g. dependent on the build height of the three-dimensional workpiece.

In some examples, once the position of the process chamber is determined and/or corrected, the process chamber is adapted to perform a substantially circular movement in a plane parallel to the carrier from a said positioning unit to a predefined position at which the material is to be supplied by the material supply unit and/or processed by the solidification device. The substantially circular movement starting from the positioning unit to the predefined position allows for a very precise movement and therefore a very precisely defined position at which the material is to be supplied by the material supply unit and/or processed by the solidification device.

In some examples, the positioning unit comprises a light source adapted to generate one or more light beams for a reference line and/or a reference plane serving as a reference for a position and/or orientation of the process chamber; wherein the one or more sensors comprise one or more light detectors, in particular laser radiation detectors; wherein the position and/or orientation of the process chamber relative to the reference line and/or the reference plane is determinable and/or correctable by the positioning system based on the light detectors detecting the one or more light beams. In example implementations in which one or more laser radiation detectors are used, effects induced by the laser(s) may be detected.

The one or more light detectors may hereby be configured to detect the position (depending on the shape of the apparatus and components, in particular the process chamber(s)) in one or two dimensions.

The apparatus may hereby advantageously allow for defining a reference coordinate system for one or more process chambers and/or one more manipulators (for example robots) to which the one or more process chambers may be coupled, in order to increase positioning accuracy of the process chamber. This may be particularly advantageous in example implementations in which the process chamber as described herein is comprised, as the supply and/or solidification of the material from which the three-dimensional workpiece is to be produced (and/or displacement material etc.) may be performed with higher position accuracy. This may further ensure little or no irregularities when supplying and/or solidifying the material during the additive layer manufacturing process. Additionally or alternatively, increased positioning accuracy based on the well-defined reference coordinate system may further allow more precisely positioning modules of the modular system at desired positions. Additionally or alternatively, increased positioning accuracy based on the well-defined reference coordinate system may also improve determining as to when the above-mentioned predefined condition is satisfied so as to use the safety control device in order to prevent releasing radiation and/or particles stemming from the solidification device and/or to switch off the solidification device. Additionally or alternatively, increased positioning accuracy based on the well-defined reference coordinate system may work together in a synergistic manner with the positioning system according to example implementations as described herein.

In some examples, the apparatus is adapted to alter, based on the moving unit moving the process chamber, the position and/or the orientation of the process chamber relative to the reference line and/or the reference plane based on said determination. This may allow for increased positioning accuracy of the process chamber in particular when supplying and/or solidifying the material from which the three-dimensional workpiece is to be produced.

In some examples, the apparatus is adapted to perform a coordinate transformation in relation to the solidification device for producing the three-dimensional workpiece via the additive layer construction method based on said determination, which may allow for precisely determining the position and/or orientation of the process chamber. The coordinates for scanning the beam (radiation beam and/or particle beam) across the material layer to be processed for producing the three-dimensional workpiece via the additive layer construction method may hereby be adjusted. The solidification device may hereby take into account that it may be inclined in the room with respect to, for example, the carrier or components of the modular system, so that exposure of the material layer using the solidification device may be adjusted. An error correction in the scanner for scanning the solidification device beam across the surface of the material layer may be performed.

In some examples, the light source comprises a laser light source for generating a linear laser beam profile. The apparatus may hereby in particular comprise a polygon scanner adapted to generate the reference line and/or the reference plane from the linear laser beam profile. A precise reference coordinate system may hereby be defined with the laser light source.

In some examples, the apparatus comprises a plurality of process chambers, wherein the apparatus is adapted to generate the light beams for a plurality of reference planes. Each of the process chambers may hereby relate to a corresponding, respective reference coordinate system, thereby allowing determining a position and/or orientation of each of the process chambers with high accuracy. The number of process chambers may hereby be the same or be different from the number of reference planes.

In some examples, the light source and/or the one or more light detectors are movable in three dimensions. This may be particularly advantageous in order to, for example, change the position of the reference coordinate system depending on a manufacturing state (for example build height) for producing the three-dimensional workpiece. Depending on the shape of the apparatus and/or components (in particular the process chamber and/or the moving unit), it may be preferable that both of the light source and the one or more light detectors are movable for flexibility of the apparatus.

In some examples, when the plurality of light detectors are arranged on or coupled to the enclosure, the determination of the position and/or orientation of the process chamber relative to the reference line or reference lines is based on a reflection of the one or more light beams from the process chamber towards the light detectors. By using, for example, two or more beam source-detector combinations, the relative displacement of the beam on the detector may be compared to the tilting of the process chamber (for example process chamber) along the x-y axis and the distance of the process chamber to the detector, thereby allowing for determining the position and/or orientation of the process chamber with high accuracy.

We further describe an apparatus for producing a three-dimensional workpiece, the apparatus comprising: a carrier adapted to receive material for producing the three-dimensional workpiece; a plurality of mobile production units, in particular each comprising the process chamber according to one or more of the example implementations as described herein, wherein a first said mobile production unit comprises a solidification device adapted to produce solidified material layers on the carrier in order to produce the workpiece by an additive layer construction method, wherein a second and/or a third and/or a fourth said mobile production unit comprises a material supply unit adapted to supply the material to the carrier and/or the solidification device, wherein one or more of the second and/or the third and/or the fourth mobile production unit comprises a gas supply system adapted to supply a shielding gas to an area that is to be irradiated by the solidification device, and wherein the second and/or the third and/or the fourth mobile production unit comprises a layer depositing mechanism for forming the supplied material into a material layer on top of the carrier; wherein the second, third and fourth mobile production units do not comprise a said solidification device; wherein the apparatus further comprises: a plurality of moving units, wherein each of the moving units is adapted to move a corresponding, respective mobile production unit relative to the carrier to position the mobile production unit oppositely to different sections of the carrier.

Efficiency during the additive layer production of, in particular, large workpieces while maintaining a sufficient level of quality/accuracy may hereby be achieved using the aforementioned apparatus. The apparatus may hereby be combined with example implementations of one or more of the process chamber, the apparatus comprising the process chamber in which one or more sensors are comprised in the apparatus, the modular system, the safety device, the safety control device, the apparatus comprising in particular the light source and light detector(s), and the positioning system as described herein, as this may allow for higher efficiency and accuracy when producing the three-dimensional workpiece using the additive layer manufacturing technique.

In some examples, the apparatus further comprises a sensing unit adapted to generate sensor signals relating to a relative arrangement of the mobile production units and the carrier; and a control unit configured to, in addition to the positioning of the mobile production units via the moving unit, provide at least one fine positioning function to compensate for an offset from a desired relative arrangement of the mobile production units and the carrier based on the sensor signals generated by the sensing unit. This may allow for higher efficiency and accuracy when producing the three-dimensional workpiece using the additive layer manufacturing technique.

In some examples, the apparatus may be configured (for example via one or more robots) place and/or remove components of the modular system according to example implementations as described herein, at defined locations.

Any one or more of the example implementations of the process chamber, the apparatus, the modular system, the method, the safety device, the safety control device, the positioning system and the apparatus for producing a three-dimensional workpiece and/or for use thereof when producing a three-dimensional workpiece as described herein may be combined in any combination.

Furthermore, in any one or more of the example implementations of the process chamber, the apparatus, the modular system, the method, the safety device, the safety control device, the positioning system and the apparatus for producing a three-dimensional workpiece and/or for use thereof when producing a three-dimensional workpiece as described herein, a plurality of mobile production units (in particular process chambers) may be implemented and/or used, whereby different mobile production units may operate on different levels (i.e. on different material layers having, in particular, a different height) and/or on different carriers. Different material supply and/or solidification processes may hereby take place concurrently or consecutively, in particular depending on a production state of the three-dimensional workpiece based on its shape. Additionally or alternatively, multiple three-dimensional workpieces may be prepared concurrently.

Providing example implementations as described herein, and in particular as outlined above, in which a plurality of mobile production units is used, may further increase efficiency when producing one or more three-dimensional workpieces.

It is to be noted that any references to the carrier specified throughout the present disclosure, in which the carrier is referred to as, for example, a reference plane or generally a reference height and/or reference location when describing any of the examples of the process chamber, the apparatus, the systems, the methods etc. for producing the three-dimensional workpiece and/or for use thereof when producing the three-dimensional workpiece, may equally relate to the references referring generally to a base reference plane, which may be defined alternatively or additionally to the carrier by the base plate (module) and/or other components and modules of the modular system, and/or by the material (for example powder material layer, the height of which may be taken into account as it may change during the additive layer manufacturing process) to be processed to produce the three-dimensional workpiece.

It is further to be noted that any references to the process chamber(s) specified throughout the present disclosure may equally relate to references to the mobile production unit(s) and vice versa.

It is further to be noted that in example implementations described herein, the safety device and the safety control device may be integral to a single device.

These and other aspects of the invention will now be further described, by way of example only, with reference to the accompanying figures, wherein like reference numerals refer to like parts, and in which:

FIGS. 1a to c show cross-sectional side views of schematic illustrations of process chambers according to some example implementations as described herein;

Figure 6A:
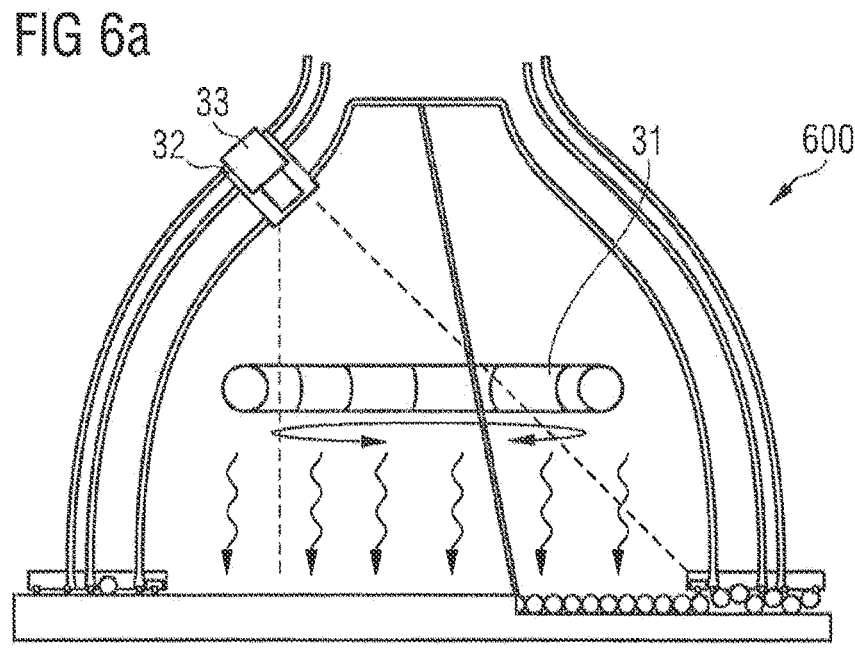
Figure 6B:
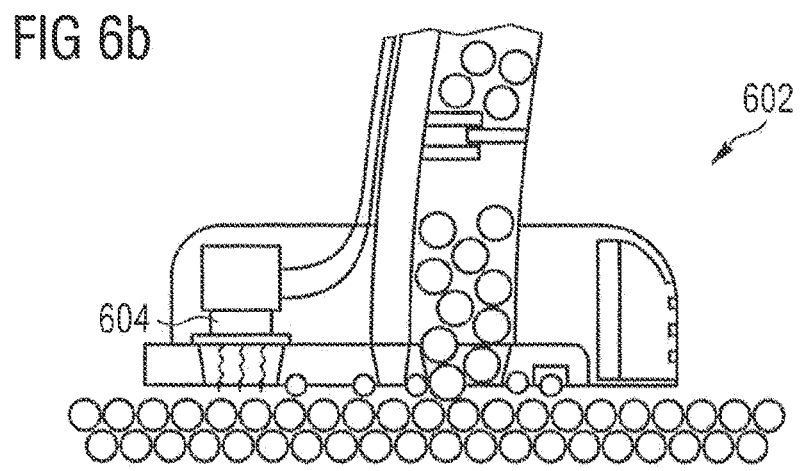
Figure 6C:
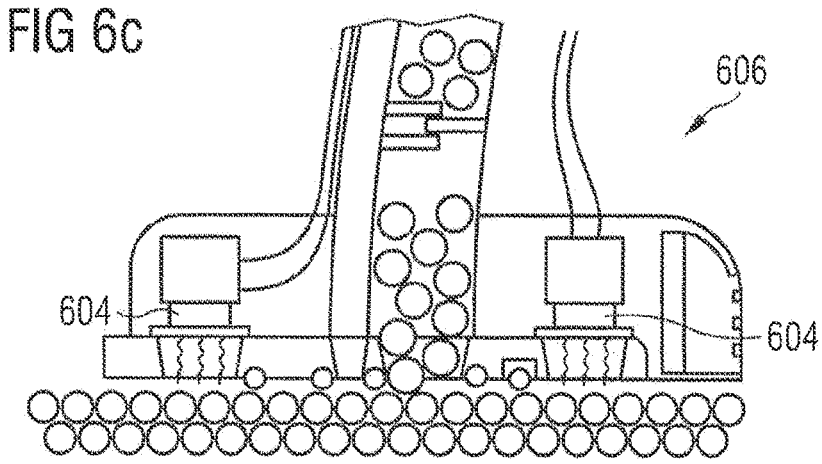
Figure 10:
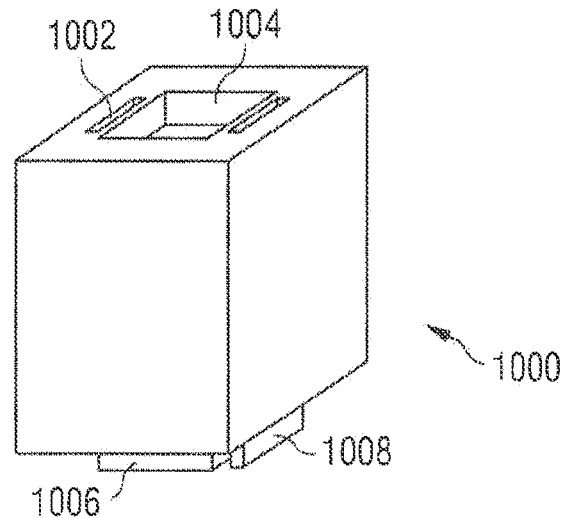
Figure 11:
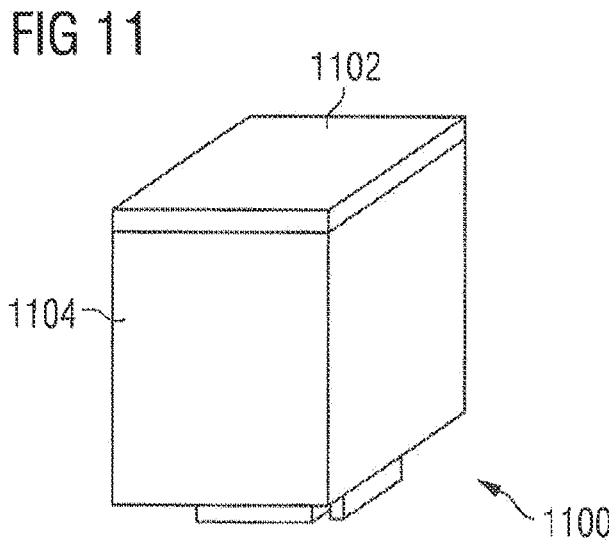
Figure 12:
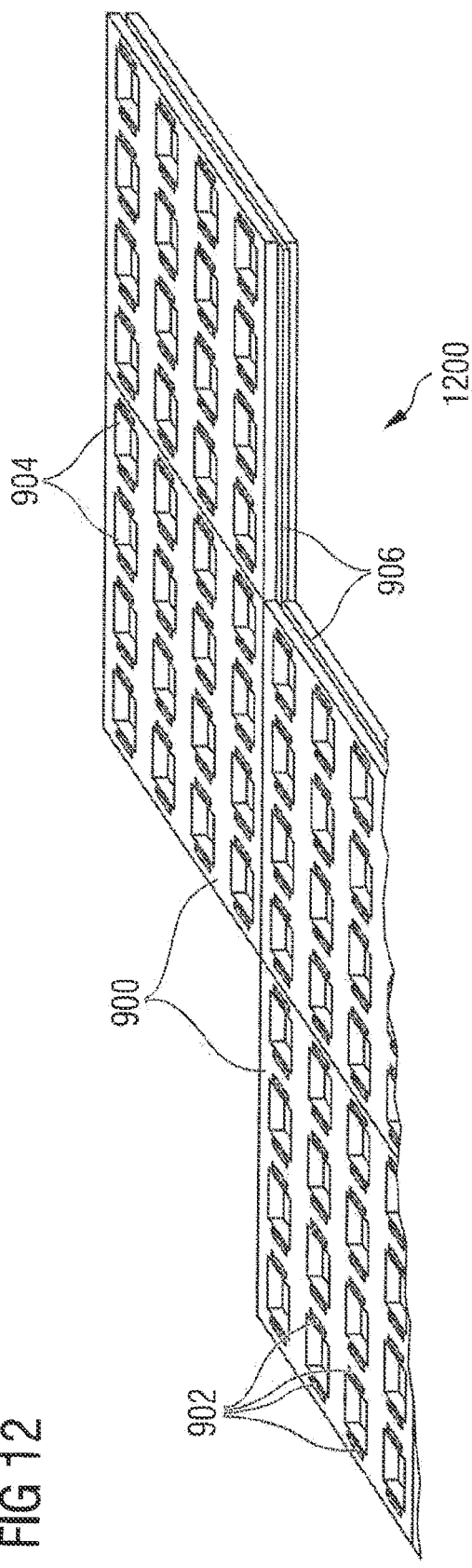
Figure 13:
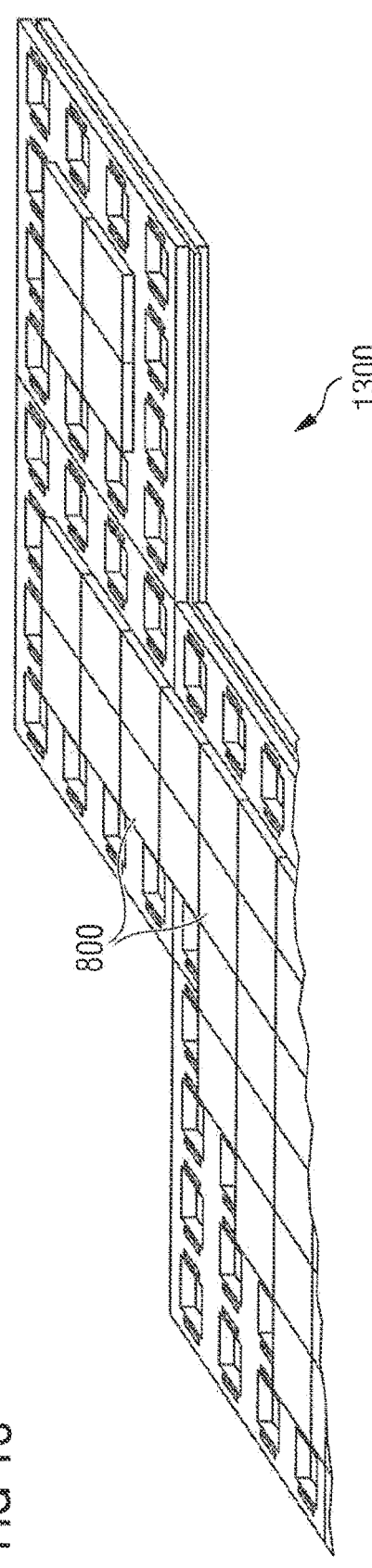
Figure 14:
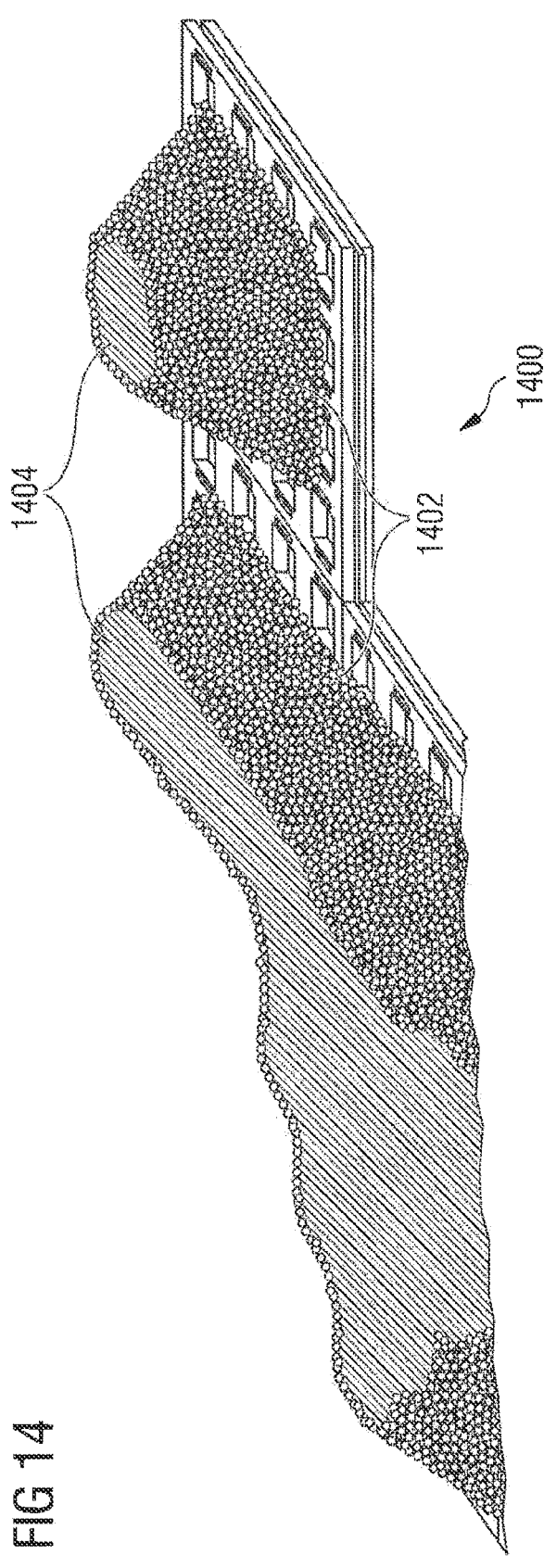
Figure 15:
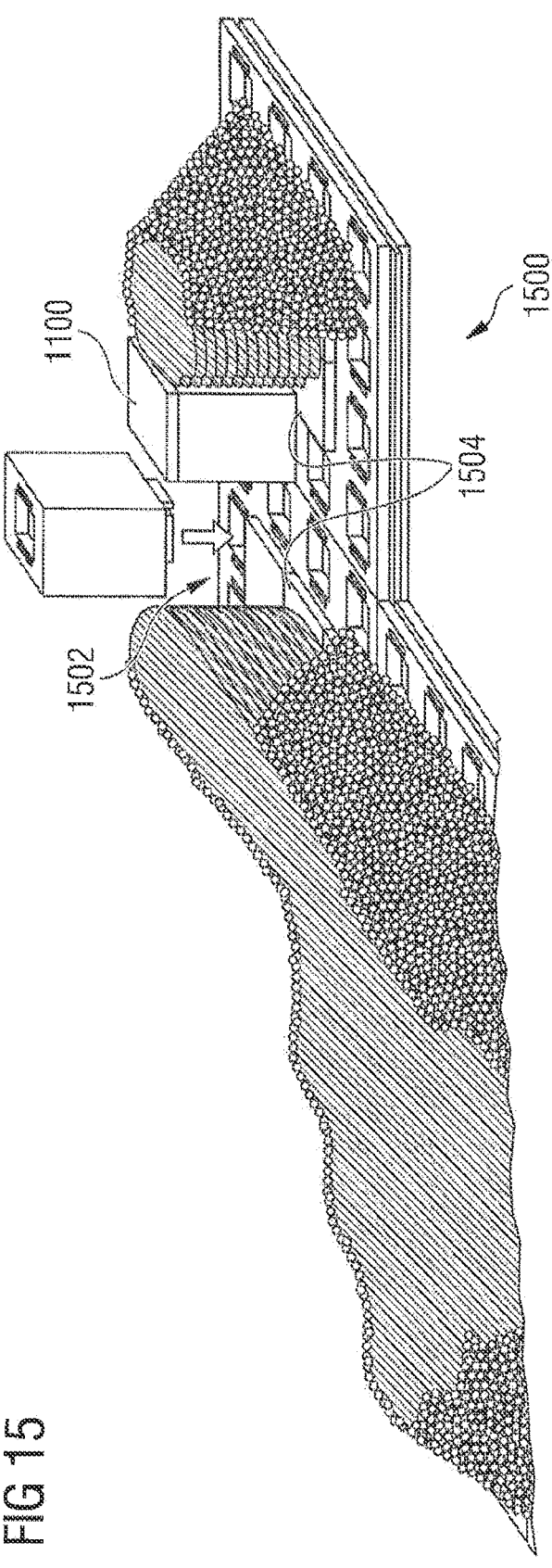
Figure 16:
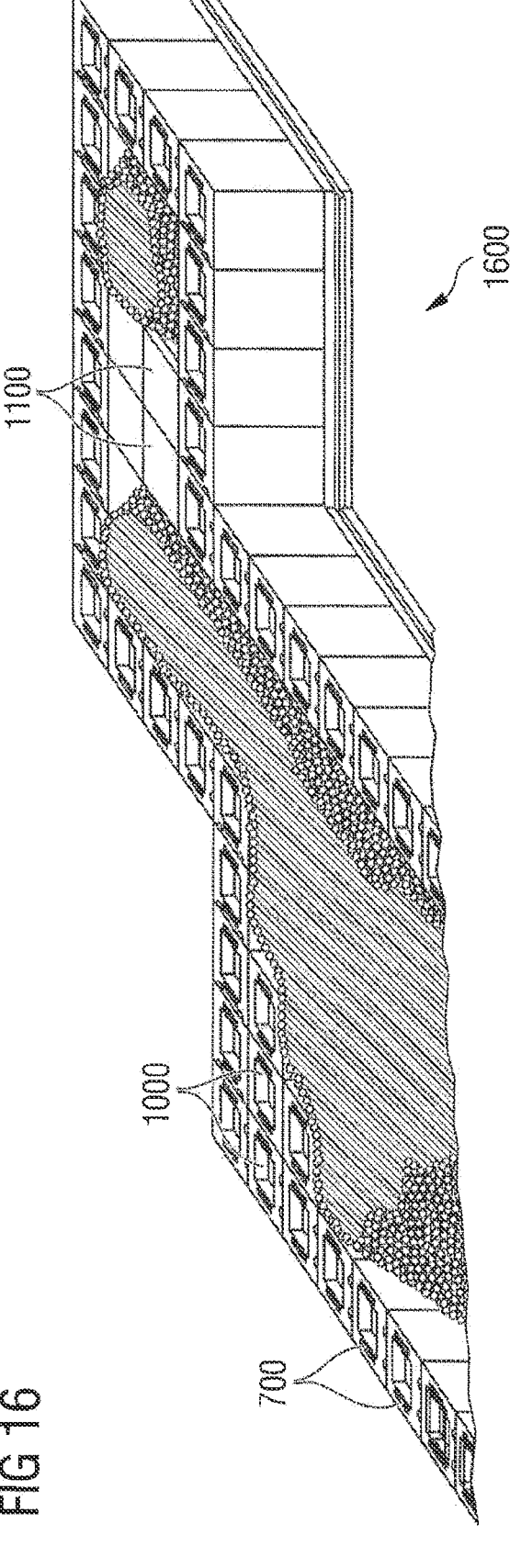
Figure 17:
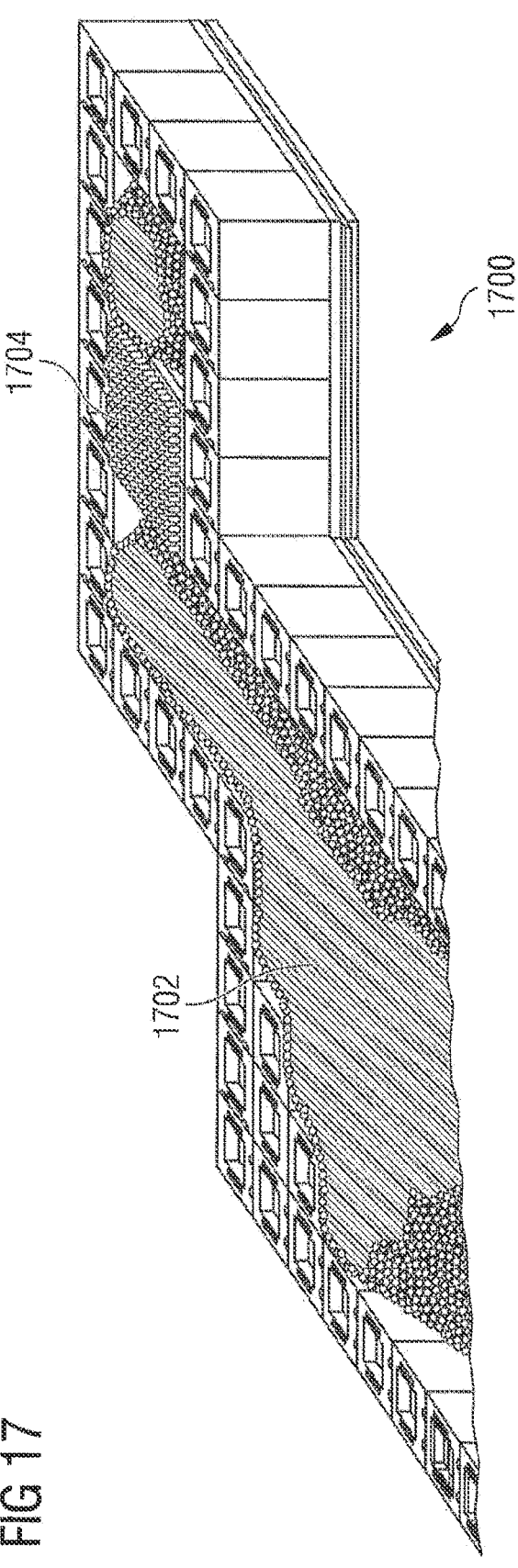
Figure 18:
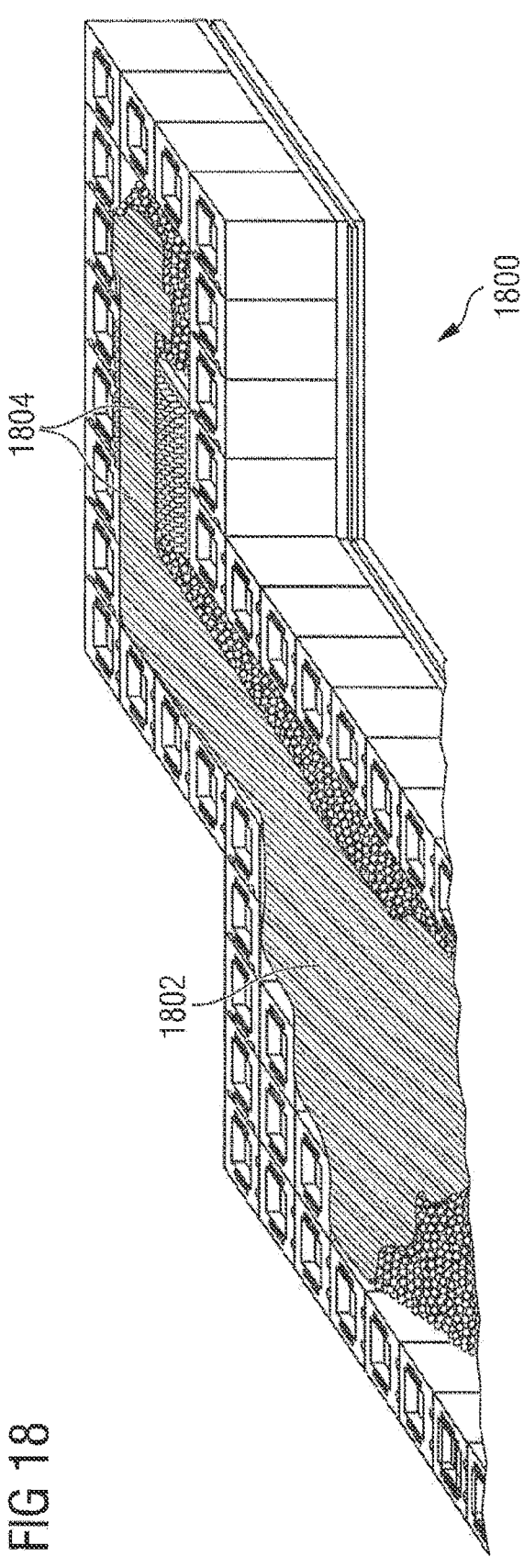
Figure 22:
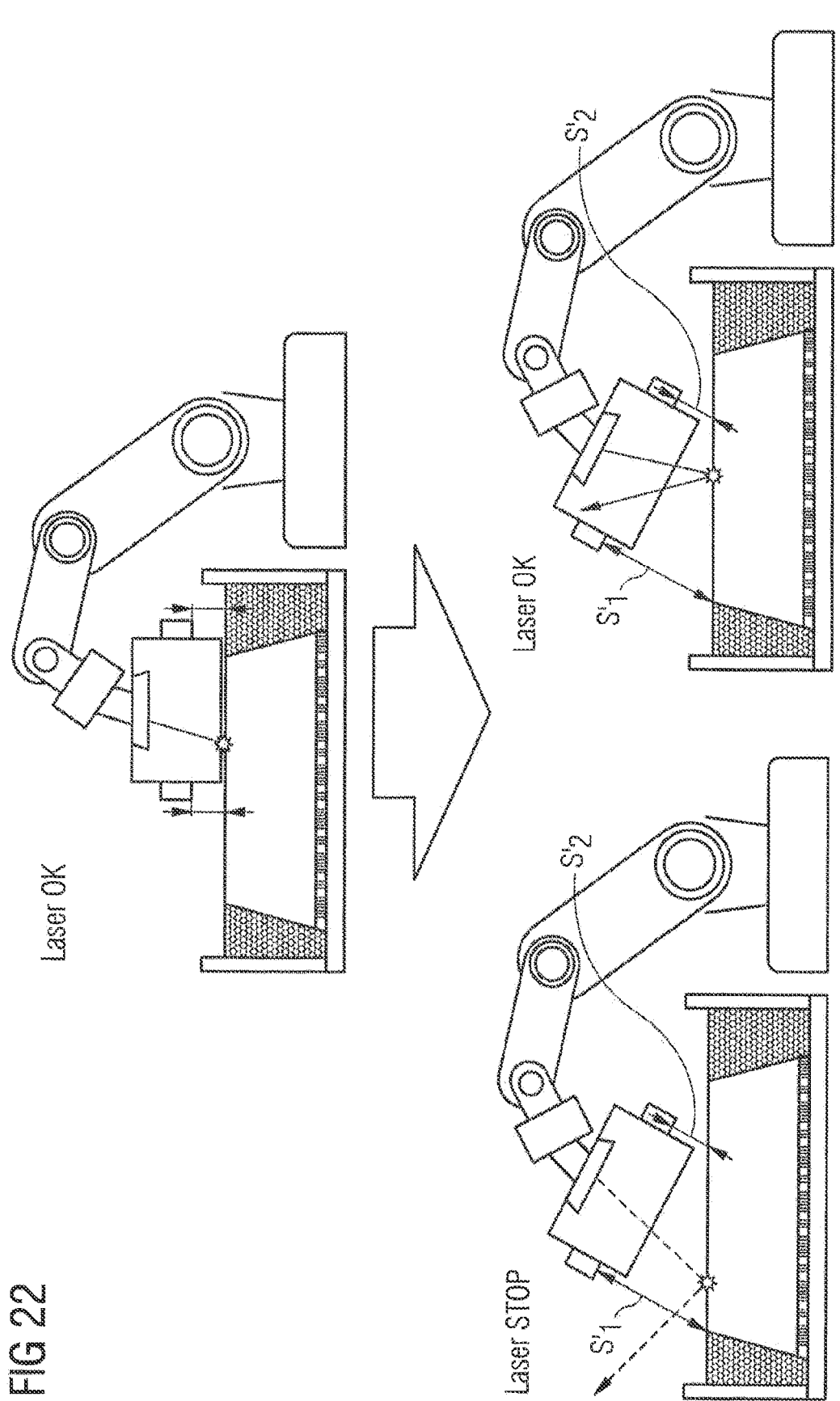
Figure 23:
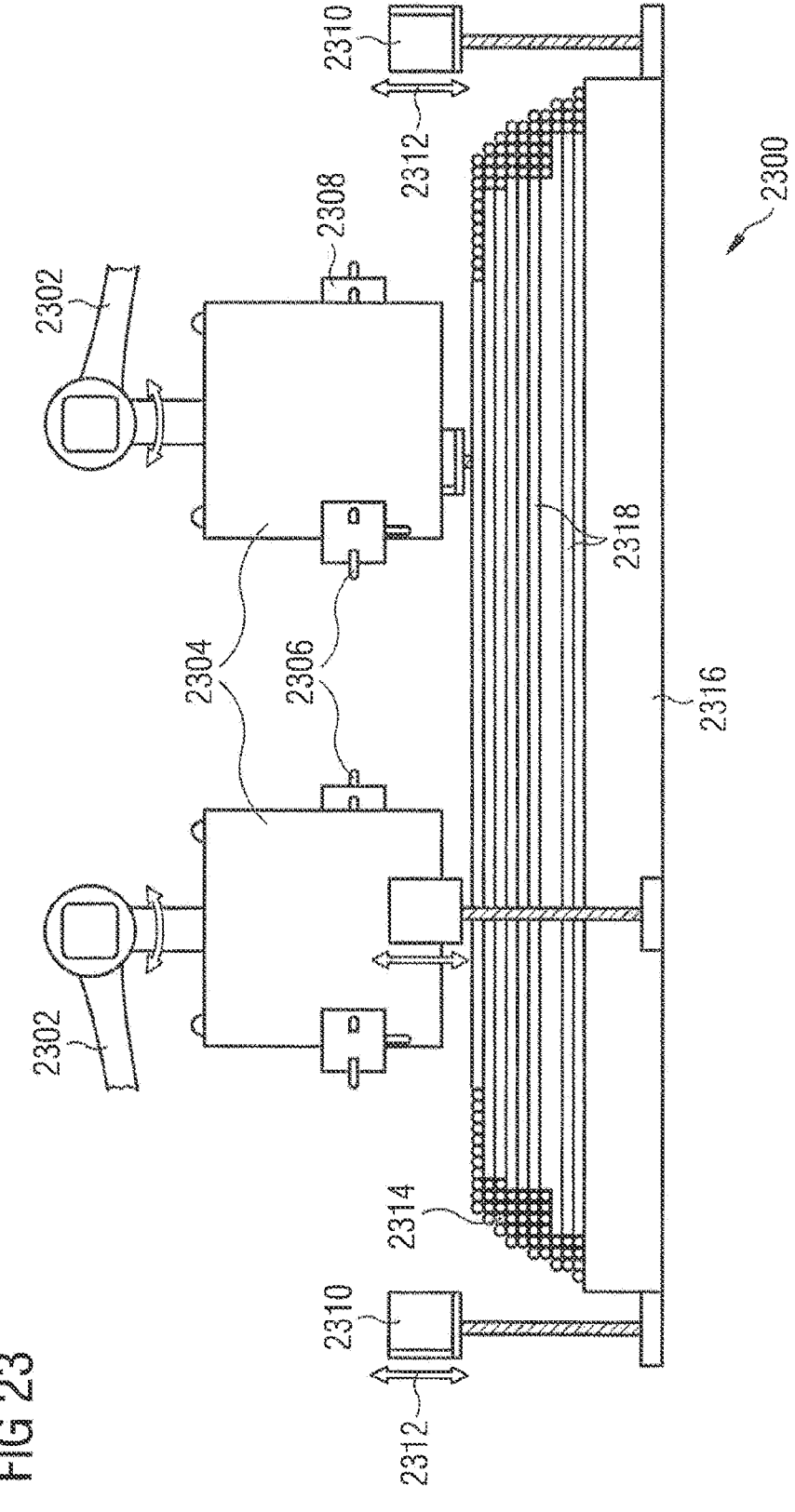
Figure 24:
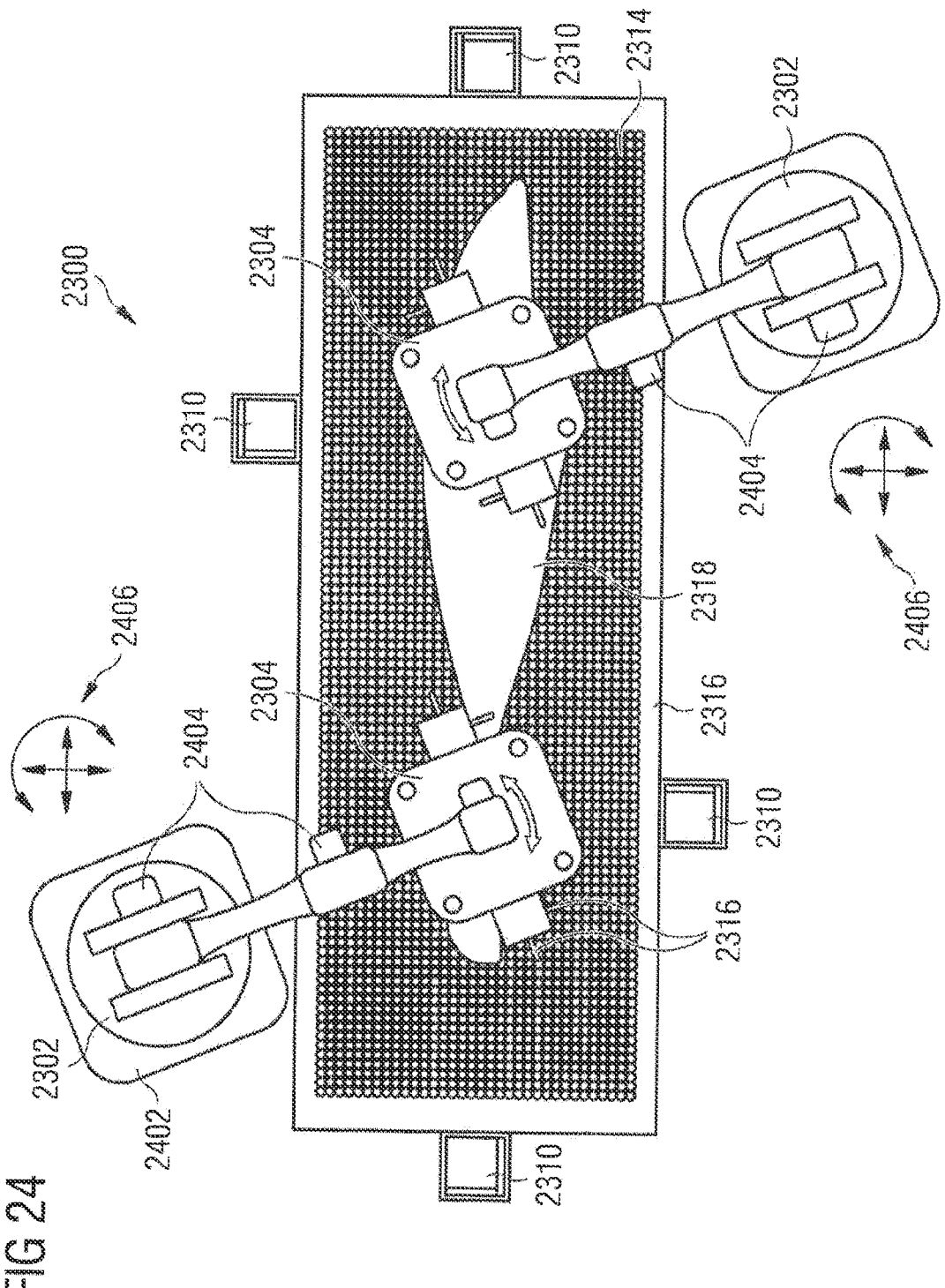
Figure 25:
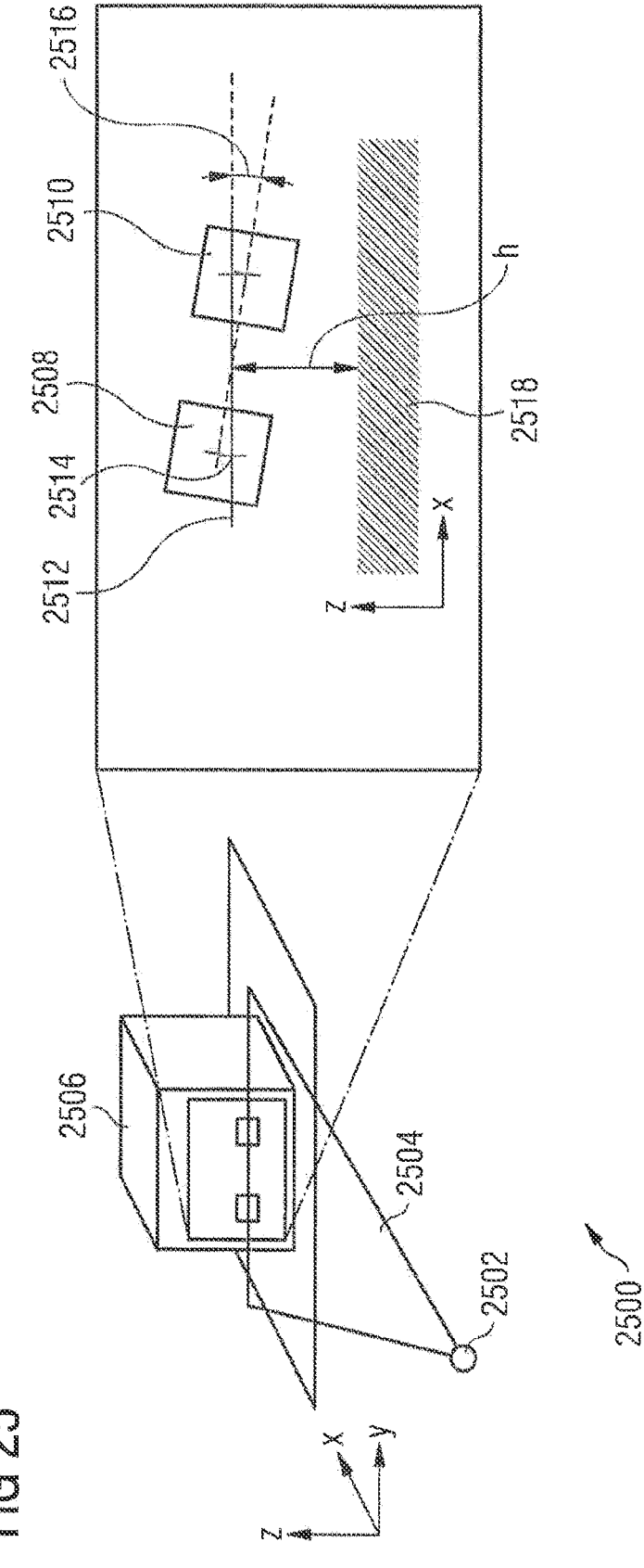
Figure 26:
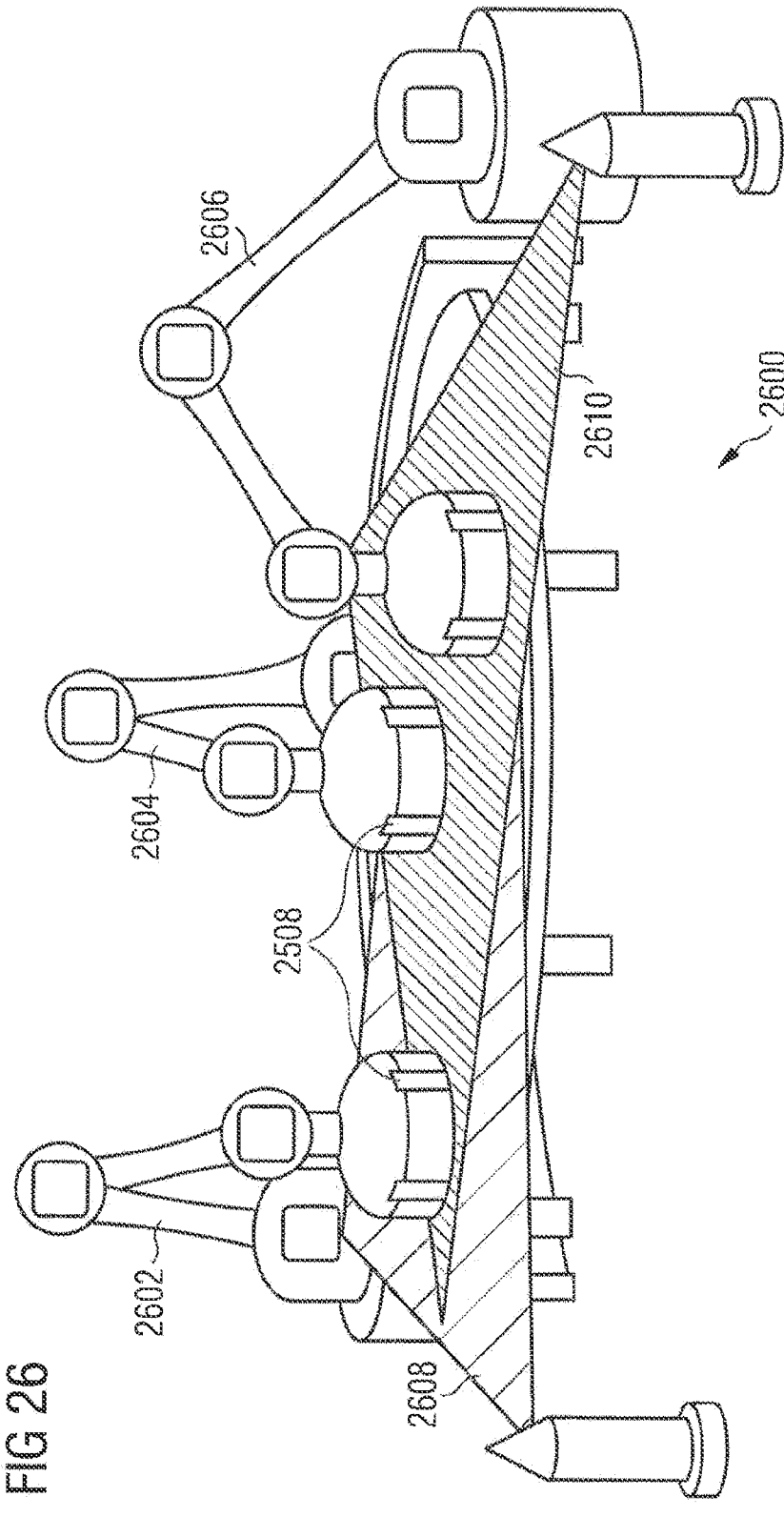
Figure 27A:
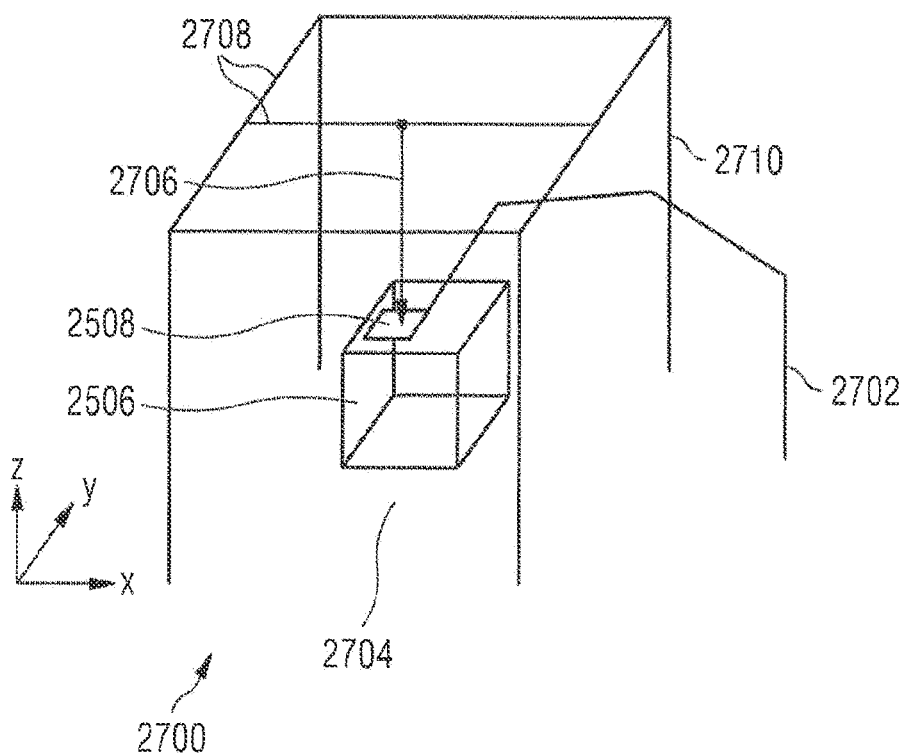
Figure 29:
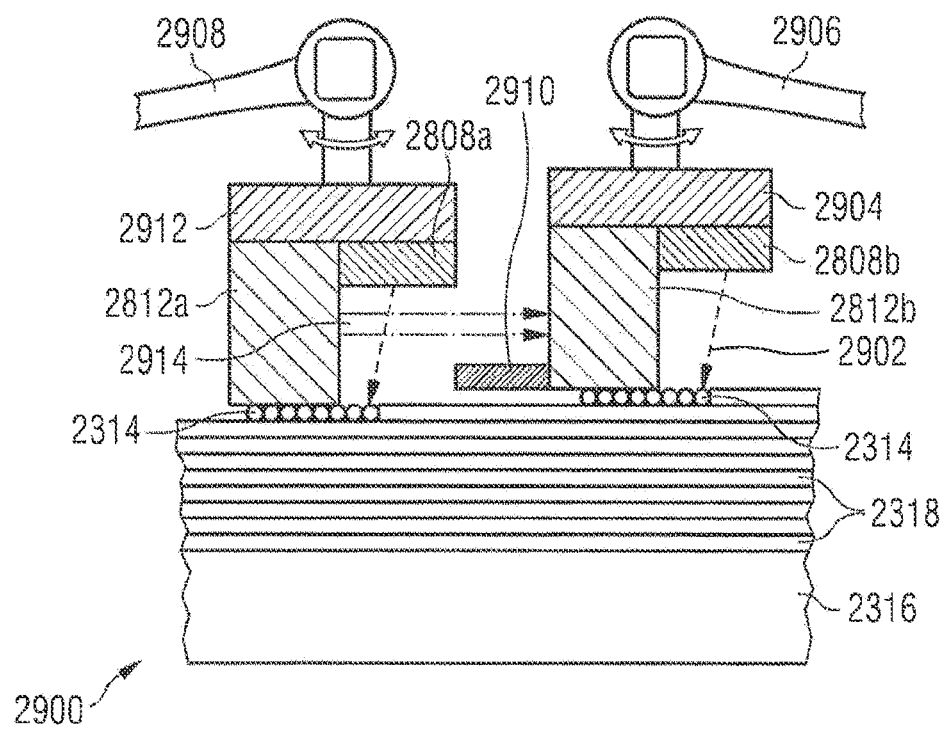

FIGS. 6a to c show cross-sectional side views of schematic illustrations of a process chamber according to some example implementations as described herein;

FIG. 7 shows perspective views of schematic illustrations of modules according to some example implementations as described herein;

FIG. 8 shows a perspective view of a schematic illustration of a substrate plate module according to some example implementations as described herein;

FIG. 9 shows a perspective view of a schematic illustration of a base module according to some example implementations as described herein;

FIG. 10 shows a perspective view of a schematic illustration of a displacement module according to some example implementations as described herein;

FIG. 11 shows a perspective view of a schematic illustration of a support module according to some example implementations as described herein;

FIG. 12 shows a schematic illustration of a structure of base plate modules according to some example implementations as described herein;

FIG. 13 shows a schematic illustration of an arrangement of substrate plate modules according to some example implementations as described herein;

FIG. 14 shows a schematic illustration of an arrangement of a processing step according to some example implementations as described herein;

FIG. 15 shows a schematic illustration for positioning the modules during the manufacturing process according to some example implementations as described herein;

FIG. 16 shows a schematic illustration of an arrangement of displacement modules according to some example implementations as described herein;

FIG. 17 shows a schematic illustration of an arrangement relating to a further processing step according to some example implementations as described herein;

FIG. 18 shows a schematic illustration of an arrangement relating to a further processing step according to some example implementations as described herein;

FIG. 19 shows a flow diagram of a method according to some example implementations as described herein;

Figure 20:
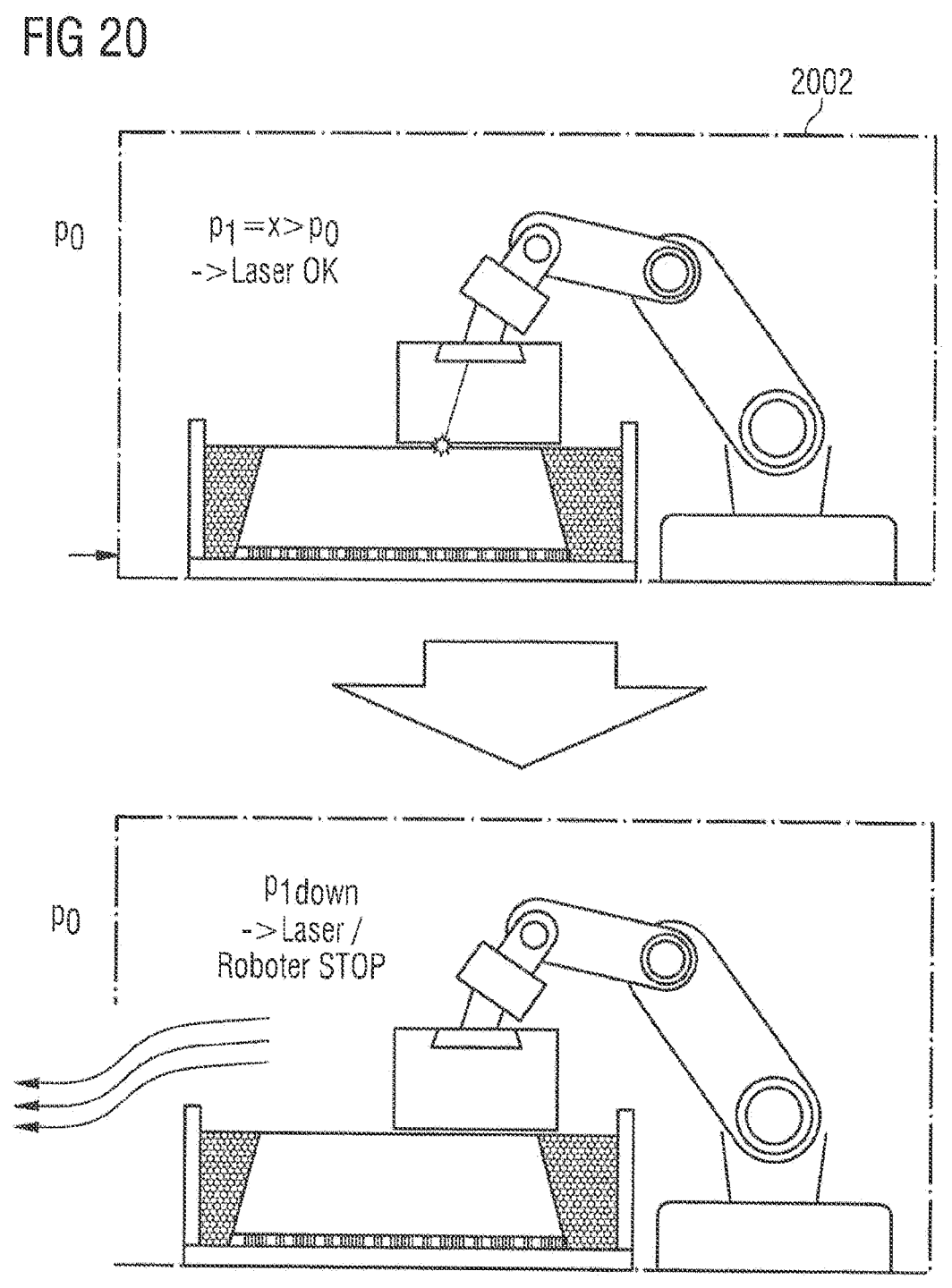

FIG. 20 shows a schematic illustration of a safety setup according to some example implementations as described herein;

FIG. 21 shows a schematic illustration of another safety setup according to some example implementations as described herein;

FIG. 22 shows a schematic illustration of another safety setup according to some example implementations as described herein;

FIG. 23 shows a cross-sectional side view of a schematic illustration of a positioning system according to some example implementations as described herein;

FIG. 24 shows a top view of a schematic illustration of a positioning system according to some example implementations as described herein;

FIG. 25 shows a schematic illustration of a system for generating a reference plane for position determination according to some example implementations as described herein;

FIG. 26 shows a schematic illustration of an arrangement of reference planes according to some example implementations as described herein;

FIGS. 27a and b show schematic illustrations of an arrangement of reference lines according to some example implementations as described herein;

FIG. 28 shows a top view of a schematic illustration of an apparatus according to some example implementations as described herein; and FIG. 29 shows a cross-sectional side view of a schematic illustration of an apparatus according to some example implementations as described herein.

Some aspects according to the present disclosure generally relate to a process chamber which may be used for producing a three-dimensional workpiece via an additive layer construction method.

Generally, systems and devices for producing, in particular, metal parts and components via an additive layer construction method have thus far been limited due to the size of their process chamber in view of the dimensions of the parts and components to be produced. There have been approaches in which a process chamber-based facility may be movable by means of linear kinematics and thus significantly larger components may be produced. Examples of the various implementations as described herein may serve for both such approaches as well as concepts with different kinds of kinematics for moving the process chamber. Example implementations of the process chamber as described herein may in particular be used while being arranged on industrial robots or another spatially flexible handling equipment.

Example implementations according to the present disclosure suggest solutions for the design of, for example, a mobile process chamber for use in motion kinematics. The example implementations as described herein may be used for one or more of powder coating, a process gas flow, inert gas shielding, process gas filtration and spray particle removal. An omnidirectional coating may be made possible.

The process chamber according to example implementations as described herein may be used for carrying out, in particular, "Selective Laser Melting" processes and/or "Laser Powderbed Fusion". The process chamber may offer solutions for various problems, as will be outlined further in detail below.

Figure 1A:
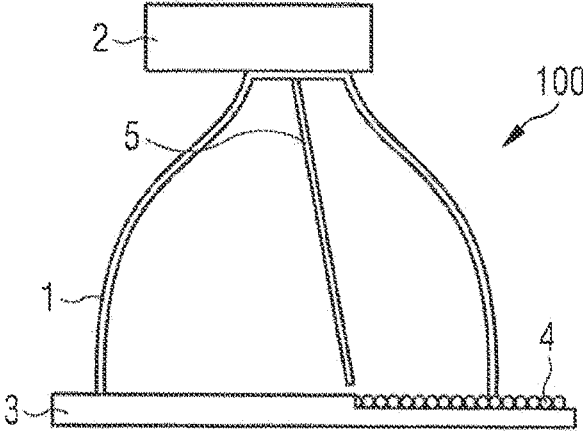
Figure 1B:
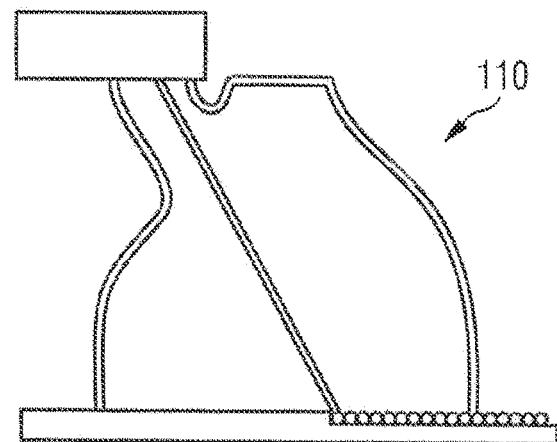
Figure 1C:
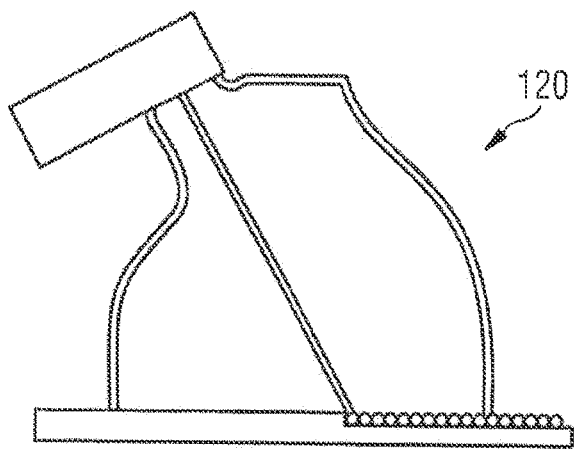

FIGS. 1a to c show cross-sectional side views of schematic illustrations of different configurations 100, 110, 120 of a process chamber 1 according to some example implementations as described herein. The shape of the process chamber 1 may hereby be different between the configurations 100, 110 and 120.

The process chamber 1 may be generally round. Especially for omnidirectional coating, a round shape may be preferred. The structure may resemble generally the shape of a bell, which may be positioned on, in this example, the powder bed 4 at a defined distance.

In this example, a beam source 2 is arranged on top of the process chamber 1. A beam, which may be a (fusion or) melting laser beam 5, is directed onto the powder bed 4 in order to process, in this example, the powder layer which is deposited onto the working surface of the carrier 3.

As can be seen in FIGS. 1a to c, the optics arrangement may vary between the different configurations 100, 110 and 120. The beam deflection unit and/or beam source 2 of the laser beam 5 may be arranged on the chamber generally perpendicular to the working surface, or may be offset laterally and/or may be mounted at a defined angle, as can be seen from the different configurations 100, 110 and 120.

Figure 2:
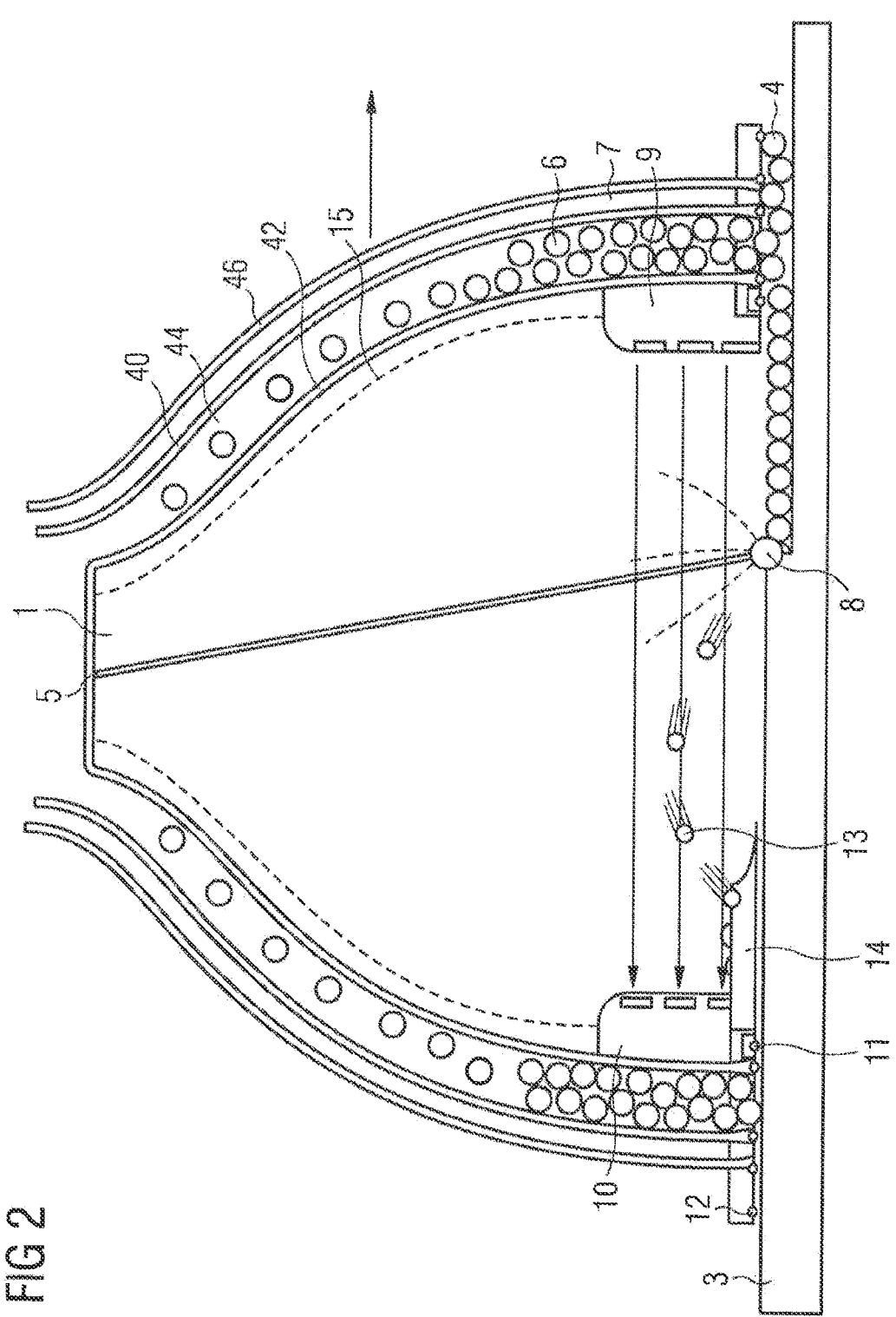
FIG. 2 shows a cross-sectional side view of a schematic illustration of a process chamber according to some example implementations as described herein.

FIG. 2 shows a cross-sectional side view of a schematic illustration of a process chamber 1 according to some example implementations as described herein. Details of the process chamber depicted in FIG. 2 may be applied to any of the general shapes of the process chamber shown in FIGS. 1a to c.

For the process chamber 1, a single-wall or multi-wall structure may be provided. In the case of a multi-wall design, the partition walls may form cavities therebetween.

In this example, a cavity 44 is formed between the middle wall 40 and the inner wall 42.

In some examples, a gas extraction unit 7 is provided between the outer wall 46 and the middle wall 40, which may remove shielding gas from the interior of the process chamber 1.

In this example, between the middle wall 40 and the inner wall 42, a circumferential powder column 6 is formed by introducing powder material from all sides.

A further wall 15 could be used for the supply and discharge of process (for example shielding) gas. This additional wall may be on the inside, as indicated with dashed lines.

In FIG. 2, an exemplary coating mechanism is shown. Layer depositing lips/brushes/blades 11 embedded in the bottom of the process chamber may smoothen the powder bed by moving the process chamber relative to the powder bed. A minimum distance between the powder column 6 and the coating device (layer depositing lips/brushes/blades 11) may prevent unintentional outflow of, in this example, the metal powder. The large number of contact points between the powder particles may create a clamping effect in this thin gap which may prevent the powder from unintentionally flowing out of the cavity 44. The clamped powder may also serve as a seal against gas leakage from the process chamber.

In this example, sealing lips 12, a process gas introduction unit 9 and a process gas extraction unit 10 may be provided. Furthermore, a particle collector 14 may be provided which may serve to collect, for example, oxide particles 13, as will be further outlined in more detail below.

Reference numeral 8 indicates where, in this example, the laser beam 5 melts the powder material in order to produce the three-dimensional workpiece.

Figure 3:
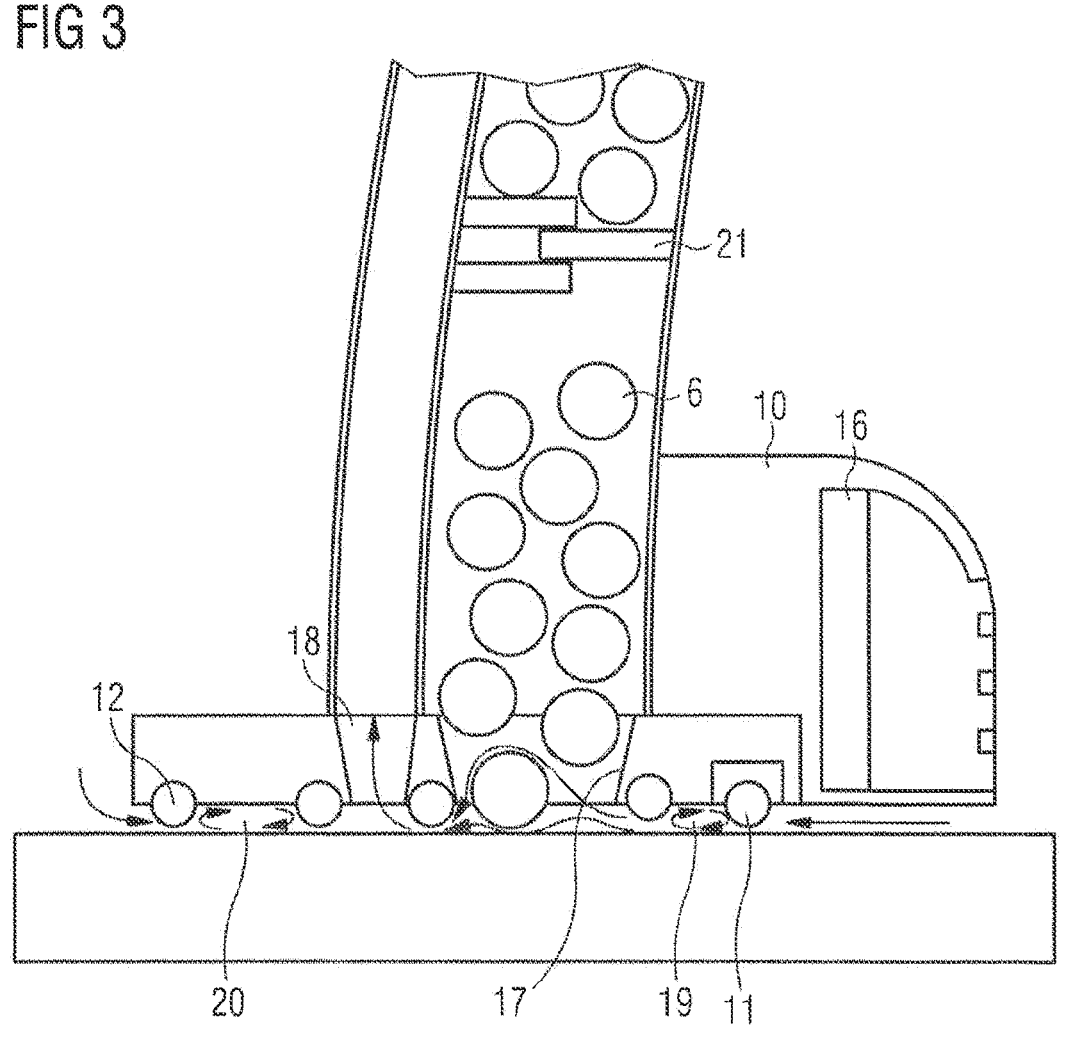
FIG. 3 shows a cross-sectional side view of a schematic illustration of a process chamber according to some example implementations as described herein.

FIG. 3 shows a cross-sectional side view of a schematic illustration of a process chamber 1 according to some example implementations as described herein. It depicts a zoomed-in part of the process chamber shown in FIG. 2. Various functions allow for shielding/sealing the process gas (for example shielding gas) within the process chamber.

In this example, the sealing lips 12 and the coating geometry (layer depositing lips/brushes/blades 11) form several gas vortex zones (19 and 20) which may serve to reduce process gas leakage from the inside of the process chamber to the outside into the environment. This is to enable a particularly pure gas in the chamber or bell interior.

Between the coating geometry (layer depositing lips/brushes/blades 11) and the first sealing lip 12, the first vortex zone is formed with process gas and is sealed to the outside by the adjacent powder column 6. The remaining process gas, which may have worked its way through between the powder particles, again hits a sealing lip. Behind this sealing lip there is, in this example, a valve/sinter insert/other suction outlet 18 with which the remaining process gas may be sucked off by means of a defined negative pressure.

In this example, the outer sealing lips form a final vortex zone 20, which prevents too much gas from the environment from being sucked in by the suction outlet 18. The vortex zones may slow down the gas flow by turbulence to such an extent that only a significantly reduced gas volume flow can occur between the zones.

In this example, a sieve 21 and a gas filter unit 16 are provided, as will be further outlined in more detail below. Reference numeral 17 indicates where the pulverulent material may be deposited from the end portion (in this example the cavity) onto the carrier.

Figure 4:
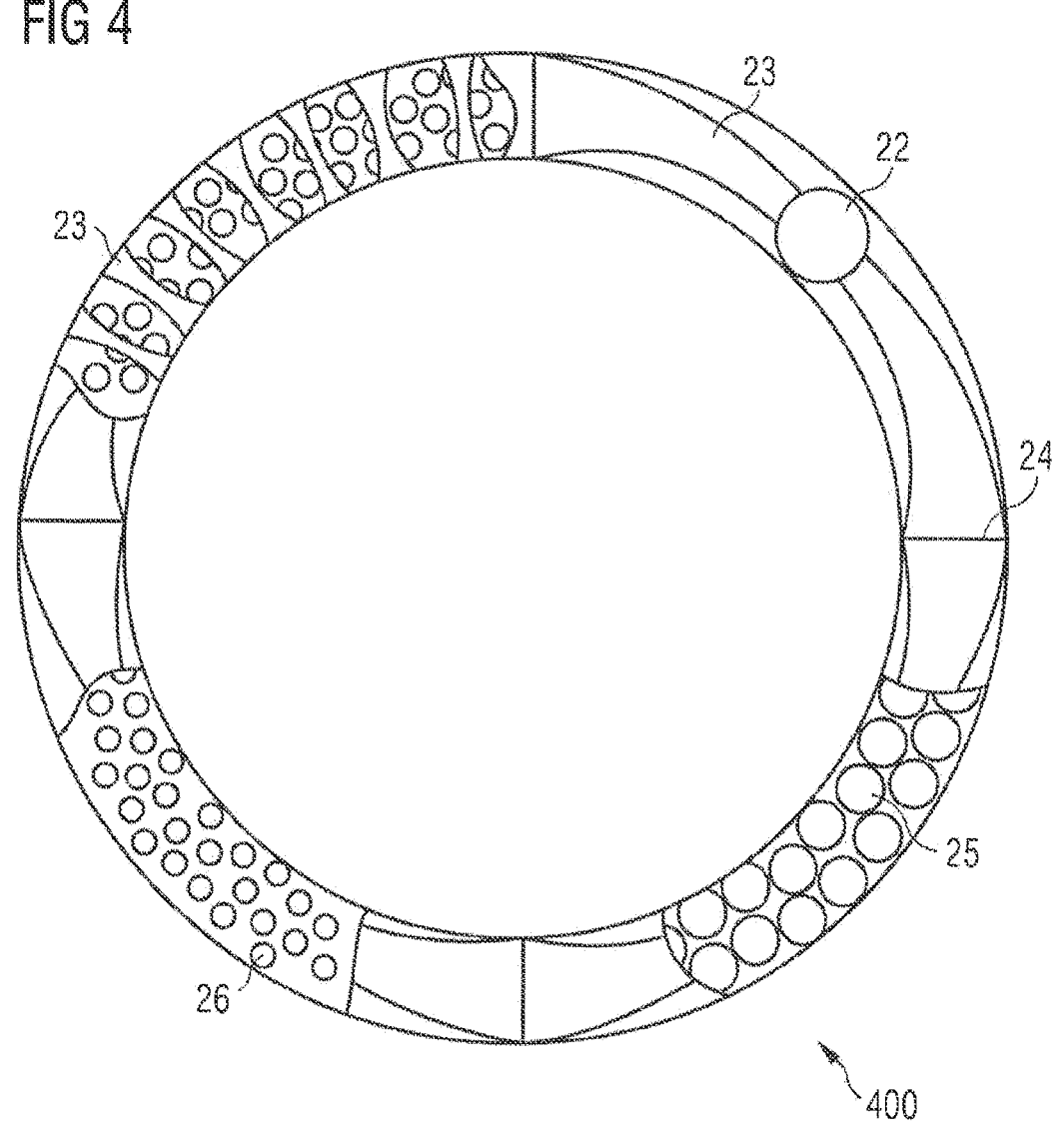
FIG. 4 shows a cross-sectional top view of a schematic illustration of a powder ring chamber according to some example implementations as described herein.

FIG. 4 shows a cross-sectional top view of a schematic illustration of a powder ring chamber 400 according to some example implementations as described herein. Different means for supplying and homogenizing the powder material are depicted.

The powder supply into the process chamber partition wall (cavity) can be coaxial to the process chamber center axis or laterally offset (as depicted via reference numeral 22 in FIG. 4).

A first means for supplying and homogenizing the powder material relates to the material feed geometry. In the case of a coaxial arrangement, but especially in the case of a lateral arrangement, powder guiding geometries 23 are, in this example, provided between the process chamber walls on the inside, which enable a circumferentially homogeneous distribution of the powder material. These geometries can be cylindrical, triangular or freely shaped. The homogeneous distribution may produce the same powder column height at all points of the powder supply mechanism in order to achieve the same pressure conditions at all circumferential directions. This, in turn, may ensure that the coating may be applied as evenly as possible in all directions on the plane in which the material is solidified.

In this example, segmentation 24 is also provided in order to provide different material, in this example, pulverulent materials 25 and 26 onto the carrier, as will be further outlined in more detail below.

A second means for supplying and homogenizing the powder material relates to a sieve distribution, as depicted in FIG. 3. The second means may be provided alternatively or additionally to the first means for supplying and homogenizing the powder material. In this example, inside the cavity in which the powder is accumulated, a circular sieve 21 is arranged above the powder column. The sieve may be designed as a perforated sheet, wire mesh, braid, in the form of a grater, as a coarse-pored sheet or other design using, for example, a metallic material. The sieve may also enhance the defined and uniform accumulation of powder in the process chamber partition wall (cavity).

As outlined above, different types of material or different powder materials may, according to some examples, be supplied onto the carrier via the process chamber. The cavity of the process chamber in which the powder column is located may, in this example, be segmented so that different powder materials may be deposited at defined points on the construction plane/carrier. The segmentation 24 may take place in two to four parts (or another number of parts), each of which may, in some examples, be filled with a different powder material 25 and 26. In some examples, one type of material may be provided per part, which material is different to that provided in any of the other parts.

The process chamber may be designed for omnidirectional coating and the process gas flow may also be swiveled. The coating may then be performed by moving the process chamber in the construction plane on the powder bed.

A material change may therefore take place during the coating process, either by moving only the process chamber in such a way that the powder column of the material to be exposed moves as a front part of the process chamber in the movement direction and thus a coating with this powder takes place, and/or by aligning the chamber (by turning) in the direction of movement of the handling device (i.e. manipulator, for example robotic arm), which produces the same effect.

In terms of material pairings, different metallic materials may be used. The construction of multi-material components/workpieces may hereby be enabled.

In terms of a filling material, additionally or alternatively to the purpose of multimaterial construction, one purpose of chamber segmentation may also be to distinguish between powder as filler material on the one hand and powder as construction material for producing the three-dimensional workpiece/component on the other hand. The construction material may be applied wherever the powder is to be solidified to produce the component. In areas of the powder bed where no component build-up is to take place, other powders, for example coarser-grained metal powder, ceramic powder, glass powder, etc. could be applied. This filling powder could perform supporting and insulating tasks without participating in the solidification process. The filling powder may be reused. For example, the amount of qualified metal powder required for the construction process may be reduced to reduce costs.

Powders of different particle sizes may also be used for example to work more precisely with (relatively) small particles 26 in edge zones and with (relatively) large particles 25 more quickly in surface zones distinct from the edge zones. Large particles 25 may also be used to reduce dust, because their larger weight means that they are less prone to being swirled by flowing gas.

Figure 5:
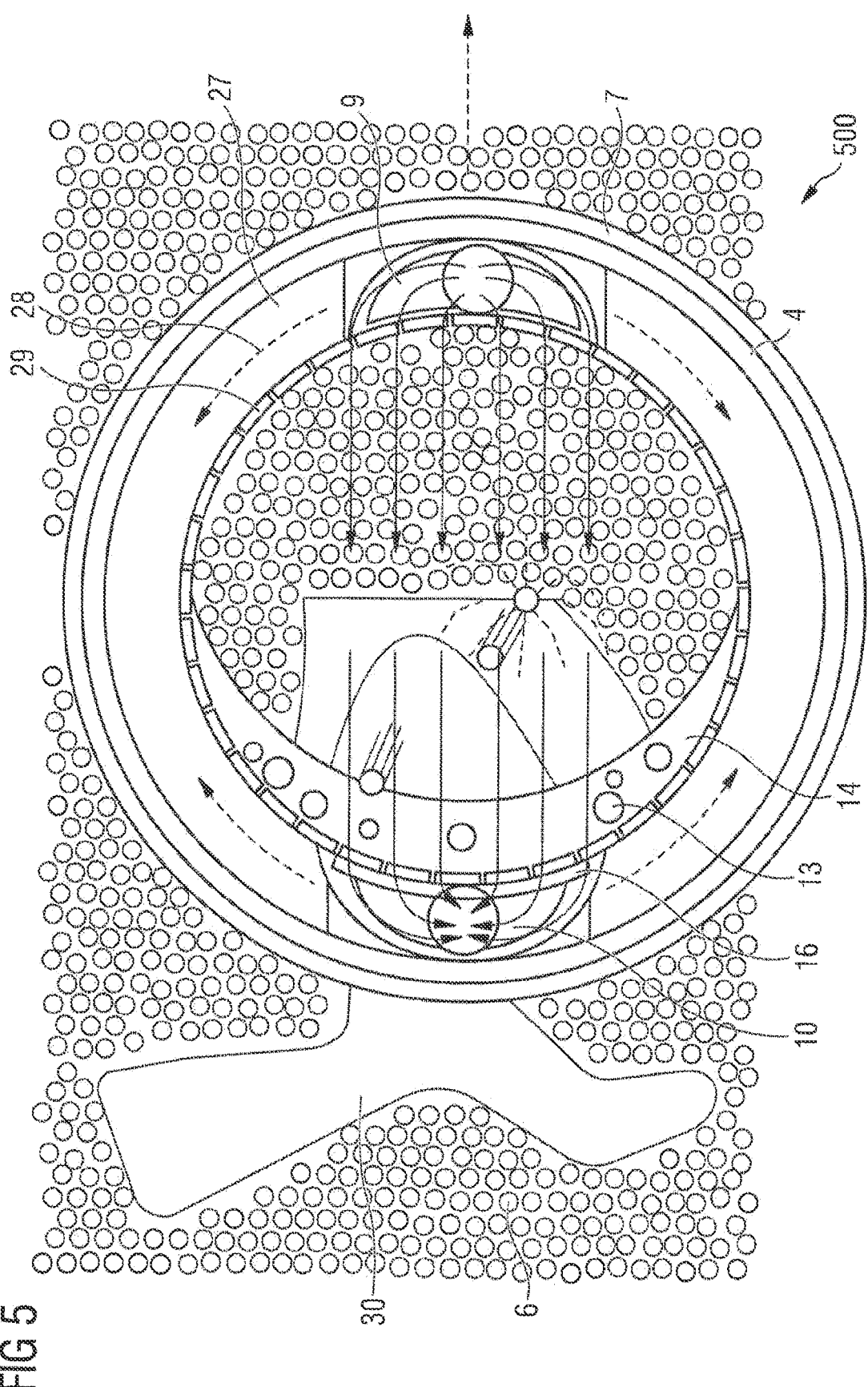
FIG. 5 shows a cross-sectional top view of a schematic illustration of a process chamber according to some example implementations as described herein.

FIG. 5 shows a cross-sectional top view of a schematic illustration 500 of a process chamber according to some example implementations as described herein.

In this exemplary process chamber, a gas flow control is provided. On the inside of the process chamber, both the process gas introduction unit 9 and the process gas extraction unit 10 are located, in this example, on a circumferential, circular guide (moving mechanism 28). A structure 29 with recesses, for example a kind of perforated plate, may be positioned circumferentially in front of the process gas introduction unit 9 and the process gas extraction unit 10. In this example, semi-circular segments 27 cover this perforated sheet structure at points where no process gas should escape (at a given point in time). Gas can be introduced or sucked in at the uncovered points. The direction of the process gas flow may be dynamically adjusted by rotating these semi-circular segments and the associated process gas introduction unit 9 and the process gas extraction unit 10. The process chamber may thus move within the powder bed plane in all directions during the layer depositing and/or solidification process, while the process gas flow may continue to be continuously aligned, for example, in the opposite direction to the external movement of the manipulator used to move the process chamber (in particular during the solidification process).

In this example, by means of a particle collector 14 (for example blade plate), which may be crescent-shaped and sit horizontally and in front of the process gas extraction unit 10, oxide particles 13 formed during the workpiece manufacturing process, too large particles and other solid ejections from the additive manufacturing process may be collected. In this example, the particles remain on the actual layer on the particle collector for the construction process and are disposed of after completion of the respective layer by pivoting the process chamber to tilt the particle collector outside the powder bed based on a slipping down of the particles from the particle collector. These particles may be collected in a designated container.

In this example, by means of a gas filter 16, which is positioned directly in front of the process gas extraction unit 10 of the process gas flow and above the particle collector 14, undesirable small particles, smoke, condensate or the like can be filtered out of the process gas directly at the process chamber. This filter may be cleaned either at regular intervals, supported by control at a specifically measured degree of contamination or together with the particle collector 14 by tilting. A temporary gas flow reversal outside the powder bed or a pressure surge also represents an additional or alternative cleaning option for the filter. Opening the process gas extraction unit downwards may additionally or alternatively be used for particle disposal.

Reference number 30 depicts an area in which a layer of powder material has been solidified.

FIG. 6a shows a cross-sectional side view of a schematic illustration of a process chamber 600 according to some example implementations as described herein.

In this example, the process chamber 600 comprises a heating unit (for example radiant heating unit or irradiation unit) 31. Within the process chamber bell, the heating unit 31 could be used to heat the powder bed or otherwise influence the material processing zone.

The heating unit could take different shapes. One preferred shape could be a round shape.

The heating unit may be aligned coaxially to the process laser and thus heat or irradiate the material processing zone homogeneously or in a graded manner.

The heating unit may comprise one or more of infrared emitters, laser diodes, VCSEL, UV emitters, LEDs, and other types of lasers.

The heating unit could be freely mounted in the process chamber or integrated into the wall.

The heating unit could be one or more continuous, one-piece sources and/or segmented, for example individually controllable sources. The sources may be both fixed and movable within the process chamber. The movement could, for example, be circular in the inside of the process chamber.

In addition or alternatively to the radiation variants, one or more inductive heating devices may be used.

At the periphery of the process chamber, in this example, ducts 32 are provided from the outside to the inside of the (in this example bell-shaped) process chamber in order to be able to obtain, using one or more sensors 33 or sensor systems, values about the process or process conditions from the inside of the process chamber when producing the three-dimensional workpiece.

An advantage over prior art systems is in particular powder application all around the building zone, such that omnidirectional coating is possible (no central coater may be needed). Furthermore, the multi-wall structure may allow extraction of process gas, which may be pushed outwards by a slight overpressure in the chamber. This may allow the process gas atmosphere to be kept particularly clean. Furthermore, the design with several small vortex zones underneath the process chamber may allow a lower leakage rate. Furthermore, the swiveling gas introduction and extraction units may allow the gas flow to always be aligned dependent on the direction of movement of the process chamber. Furthermore, compared to ideas in the art, the particle collector may catch waste products instead of integrating them into the part to be built. The integrated gas filter may eliminate the need for external filters. Furthermore, the radiant heating may allow in particular the local influence on the temperature balance in the chamber and on the powder bed. Furthermore, the powder distribution geometries may ensure an evenly circulating powder column.

All the above may result in efficiently producing the three-dimensional workpiece with high quality.

FIG. 6b shows a cross-sectional side view of a schematic illustration of a process chamber 602 according to some example implementations as described herein. In this example, a ring-like shaped heating unit 604 is provided at the bottom portion of the process chamber. The heating unit 604 could be one or more continuous, one-piece sources and/or segmented, for example individually controllable sources. The heating unit may comprise one or more of infrared emitters, laser diodes, VCSEL, UV emitters, LEDs, inductive radiation sources and other types of radiation and/or particle-emitting sources. In this example, the heating unit 604 is arranged radially outwards from other components and in particular of the cavity from which powder (or another material) is supplied.

The ring-like shaped heating unit 604 may be used to heat the metal powder for one or more of the following purposes: increasing the temperature level for voltage reduction (of the solidification unit/device for solidifying the material), drying the powder, increasing adhesion forces between the powder particles (sinter columns) to passivate the reactive powder and/or reduce turbulence and flow of powder outside the process chamber and/or reduce welding smoke or particle flight within the process chamber in the SLM process and/or reduce the supplied material cone for the assembly of the three-dimensional workpiece, since the resulting powder deposit may enable steeper material deposit angles in the assembly direction of the three-dimensional workpiece.

FIG. 6c shows a cross-sectional side view of a schematic illustration of a process chamber 606 according to some example implementations as described herein. The process chamber 606 is generally identical with the process chamber 602, whereby the process chamber 606 comprises two heating units 604, one radially outwards and one radially inwards from the cavity from which powder (or another material) is supplied.

As will be appreciated, components of two or all of the process chambers 600, 602 and 606 may be combined. Components of each of process chambers 600, 602 and 606 and any combination thereof may be combined with one or more of the components of the process chambers as depicted in any one or more of the other figures.

Efficiency for producing of the three-dimensional workpiece may be improved further using a modular system according to example implementations as described herein.

The process chamber may be attached to a robot or robotic arm to carry out the additive manufacturing process. An objective of the design may be, among other things, to construct large-volume additive components while maintaining the greatest possible flexibility with regard to the production arrangement. The following considerations may be taken into account.

Depending on the construction order (for example for large components), the mobile production unit (which may comprise the process chamber) may consume more space. This may call for a solution for the flexible composition of the installation space in order to achieve an overall reduction in manufacturing site dimensions.

Furthermore, in the case of a production order with a large construction volume, correspondingly more powder may need to be provided for the process. In order to reduce the necessary acquisition costs and to avoid powder aging, solutions may be needed to reduce the amount of powder required.

Furthermore, the encapsulation of the process and thus the use of shielding gas in the process may make it possible to reduce the influence of external negative influences on the process.

Further still, the support volume required for the laser beam melting process may depend, for example, on the shape, orientation and size of the component to be produced. A reduction of the support quantity may be achieved by suitable measures to increase economic efficiency (by saving time and material).

The above may form the starting point for the description of the following example implementations with which efficiency of producing the three-dimensional workpiece, in particular in line with the above-described process chamber, may be further improved, to build up on achieving improved efficiency based on the process chamber. The example implementations include suitable configurations for the modular design of process components, which can be flexibly supplemented, for example depending on the construction progress. The technical advantages resulting from this offer, on the one hand, the potential to reduce the consumption of resources when using the mobile production unit (comprising the process chamber) (for example by using smaller quantities of powder for component construction or a reduced support volume), which may also improve efficiency when producing the workpiece (in particular as certain components or modules may be used so that the material may not need to be deposited at the corresponding area filled by the components or modules). On the other hand, the approaches described herein make it possible to design flexible installation spaces that can be designed, for example, depending on the shape of the workpiece to be produced.

In addition to using the modular system for the mobile production unit, it is also conceivable that the modular system may be used for currently existing manufacturing sites and technologies.

A procedure is described with which a flexible installation space arrangement depending on the construction order (for example shape of the component, alignment) may be used predominantly (but not exclusively) for the mobile production unit.

FIGS. 7 to 11 show different modules used in the process for producing the three-dimensional workpiece.

FIG. 7 depicts different wall modules 700 with different coupling directions. Shown are a sealing body wall module 702, a sealing element wall module 704, a positioning unit wall module with a top side 706 and bottom side 708, a clamping unit with a top side 710 and a bottom side 712.

FIG. 8 depicts a substrate plate module 800. It comprises, in this example, a positioning unit substrate plate 802, a substrate plate 804 and a clamping unit substrate plate 806.

FIG. 9 depicts a base (plate) module 900. It comprises, in this example, clamping unit base plates 902, positioning unit base plates 904 and plug connection elements 906 (which may be based on, for example, form closure for connecting different base (plate) modules).

FIG. 10 depicts a displacement module 1000. It comprises, in this example, a displacement clamping unit top 1002, a displacement positioning unit top 1004, a displacement positioning unit bottom 1006 and a displacement clamping unit bottom 1008.

FIG. 11 depicts a support module 1100. It comprises, in this example, a substrate plate module 800 and a displacement module 1000.

The explanation of the individual features and properties of the modules is presented in the following using an exemplary and preferable process flow. For this purpose, individual process steps are selected in chronologically ascending order (process time increases with the image number) and presented as examples in FIG. 12 to FIG. 18.

In a preferred implementation, the manufacturing process first starts with an arrangement of base plate modules. These elements represent the lowest component of the manufacturing process to be carried out with the mobile manufacturing/production unit and function as a spatial separation between the foundation (for example hall floor) and the process components above (powder, component etc.).

The arrangement of the plates follows an automatic or manual arrangement to be selected by the user and may, for example, depend on the workpiece to be produced. The resulting advantage of this procedure is that the base (plate) modules may be laid closely to the workpiece contour, resulting in a space-saving and flexible arrangement. This also manifests itself in a reduced use of powder material for the production of the powder bed and thus a lower powder quantity which is exposed to powder aging.

FIG. 12 shows a schematic illustration of an exemplary structure 1200 of the base (plate) modules in an assembled manner.

In this example, the clamping unit base plates 902 comprise clamping arrangements. The positioning unit base plates 904 and the plug connection elements 906 comprise, in this example, form closures.

The connection between adjacent base (plate) modules can, for example, be made via form closures (i.e. positive locking), force closures or a combination of various connection techniques, such as form closures and force closures.

FIG. 12 shows the preferred square shape of the base (plate) modules on the upper side. However, it is also conceivable to use other adapted shapes (for example star-shaped), which can be designed, for example, depending on the workpiece job and/or the available space. In the case of a shape other than a square shape, a continuous gap-free arrangement of the base (plate) modules and substrate plate modules arranged above them may need to be ensured at least in part so that a continuous component structure is possible (for example between adjacent base plate modules).

FIG. 13 shows a schematic illustration of an arrangement 1300 of substrate plate modules.

The substrate plate modules may be connected on the underside (see FIG. 8) to the underlying base plate modules, for example, by means of force and form closure. In a preferred variant, the base plate modules have suitable counterparts on functional elements running in a right-angled grid for holding and fixing the substrate plate elements lying on them. FIG. 12 shows an example of these elements as positioning units (for example form closure, i.e. positive locking) and clamping units (for example clamping device). Any other suitable connection form can be selected.

It should be noted here that the joining/connection techniques used in this example enable temporary fixing so that, on the one hand, unintentional displacement of the modules connected to one another is avoided during the (manufacturing) process and, on the other hand, simple separation of the modules from one another is still possible after the manufacturing process for producing the workpiece.

The substrate plate modules on the upper side (see FIG. 13) also have, in this example, a preferred square shape. The number and location of the substrate plate modules preferably follows the workpiece shape and/or the selected initial layers of the build job.

FIG. 14 shows a schematic illustration of an arrangement 1400 of a processing step in which, in this example, different regions with respectively adjacent substrate plate modules occur separately from one another, on which workpiece layers may be prepared (at least initially) separately from one another.

In FIG. 14, the powder material 1402 is shown, based on which the solidified layer n 1404 has been prepared.

As construction of the workpiece progresses, a powder cone may be formed along the layer contour and depending on the powder application. The powder can be applied selectively (for example by means of a suitable powder application mechanism, for example, as outlined above, using the process chamber as described herein), for example in order to reduce the volume of powder used. This may result in the formation of several powder cones (see FIG. 14). The powder application may need to be selected in such a way that there is no slippage of the powder areas to be solidified prior to their exposure (along the cone of bulk material). This may be ensured by a stronger extension of the powder application area beyond the workpiece or layer boundaries.

The chosen arrangement of the base plate modules (see FIG. 9) may need to also be chosen so that the powder material can remain completely on it. The powder material may hereby cover the substrate plate modules (see FIG. 14).

If the process has progressed so far that (starting from the top of the base plate modules) the height of a current layer n exceeds the height of the wall, displacement and/or support modules, the modules mentioned can be taken into account in the following arrangement (if applicable). The positioning of these modules in a preferred variant is not planned beforehand in order not to cause any restrictions with regard to the radius of action during the layer-wise process of the mobile solidification and coating (material supply) unit. On the other hand, the arrangement of the base plate modules can also be dimensioned (before the material layer supply and processing) that any positioning of the production unit above the relevant process zones or substrate plate modules is possible. If wall modules are already arranged before the layer build-up, this may have the advantage of a dense border of the process zone (for example for the introduction of shielding gas in this clamped "basin"). Furthermore, a combination of wall, displacement and/or support modules to be positioned before and during the process may also be considered.

FIG. 15 shows a schematic illustration 1500 of a preferred variant for positioning the modules during the manufacturing process.

In this example, a wall module is added as shown by arrow 1502. Process regions 1504 are further indicated at which powder has been removed.

Before applying the wall and support module shown at the intended positions, it may, in some examples, first be necessary to remove the powder material at these points (if applicable) in order to expose the underlying functional elements of the base plate elements and to enable a connection, for example of the wall module with the respective base plate module. Powder removal and module positioning can also be carried out selectively where the build-up process of the current layer or production unit is not taking place (for example if possible due to the workpiece size) in order to avoid process interruptions and reduce non-productive times. Powder removal (for example using vacuum suction means) and module handling can be carried out using suitable manipulators (for example one or more robots).

After application of the modules mentioned and intended for each case, the powder bed in the gaps left empty may have to be filled with powder material so that a uniform layer application is also possible for the next layer n+1. In some examples, the powder supply required for this can either be carried out via the mobile production unit or can be realized by further manipulators (for example one or more further robots).

FIG. 16 shows a schematic illustration of an arrangement 1600 in which, amongst others, displacement modules are used.

By using displacement modules, far less powder material may be required for the filling process with the material, while the wall modules may also reduce the cone of material that is formed. Using displacement modules may make the manufacturing process more efficient.

In FIG. 16, the use of support modules between two previously separate construction areas is also shown. On these areas, the construction of shortened support structures can take place according to the exemplary construction progress shown.

FIG. 17 shows a schematic illustration of an arrangement 1700 relating to a further processing step according to some examples as described herein.

The solidified layer n+1 (1702) is depicted. The built support structures 1704 (belonging to layer n+1) are also shown.

This means that it may no longer be necessary to set up support structures on the basis of the substrate plate level, which reduces unnecessary material consumption and process time.

FIG. 18 shows a schematic illustration of an arrangement 1800 relating to a further processing step according to some examples as described herein. The next layer n+2 (as provided in the example) can hereby then, following from the processing step shown in FIG. 17, be extended over the support structures in order to follow the previously defined workpiece or layer shape.

The layer structuring may be continued until the next wall, displacement and/or support modules can be placed on existing modules and the processes described above can be repeated. The same functional elements or connection techniques as those already used on the top of the base plate modules can be found in a preferred variant on the top of the respective modules.

The layer structure and the module arrangement that follows depending on the progress of construction may be repeated until the last layer has been completely exposed and hence solidified.

This procedure may, in some examples, need to be supplemented by the fact that above a certain height, for example shear stresses can act on the wall modules (due, for example, to the powder mass pressing against them), so that additional reinforcement modules (not shown) may be used. These can be, in a preferred form, plate-shaped and connect to each other based on the above described connection techniques on the upper side of several wall modules. Such an intermediate plate part may also have corresponding connecting elements on the upper side, so that a next wall module can later be connected on top of it.

The shape and size of the wall, displacement and/or support modules may, for example, be adapted by the construction job or the space available. The combination of different sizes in one construction process is also conceivable, so that, for example, the size and number of gaps with powder material can be largely reduced through the use of displacement modules.

In addition to the displacement modules as described above, bulk material (for example having "spherical" shapes) may also be used to perform the "displacement function". This can also be used in addition to the displacement modules to fill up remaining intermediate areas (where, for example, no displacement module could be used due to lack of space) and further reduce powder consumption. After the manufacturing process, this bulk material can, in some examples, be separated from the powder again and be fed to a subsequent process by its preferably much larger fractionation compared to the powder material, for example by sieving processes.

In a further variant, the displacement modules can also be replaced by individual solid "rods" (not shown), which, starting from the substrate plate and depending on the progress of the process, are driven up layer by layer in the direction of assembly through sealed openings in the substrate and/or base plate modules (for example through a bottom recess). These rods may also be used in addition to the displacement modules. This may also be combined with the bulk material described above, with our without the use of one or more displacement modules.

The above-described modules etc. are particularly advantageous to provide for an efficient process for producing the three-dimensional workpiece.

The process may equally be applicable to other material forming techniques, such as printing techniques.

FIG. 19 shows a flow diagram of a method 1900 according to some example implementations as described herein.

In step S1902, a modular system (according to any one of the example implementations as described herein) is provided.

In step S1904, one or more substrate modules are arranged on one or more locations of the base module dependent on where material is to be processed based on a shape of the three-dimensional workpiece to be produced.

In step S1906, the material is provided on the one or more substrate modules.

In step S1908, the material is processed to produce the three-dimensional workpiece via the additive layer manufacturing technique.

In the method 1900, the processing steps according to any one or more of the arrangements shown in FIGS. 13 to 18 using one or more of the modules shown in FIGS. 7 to 11 may be used.

The method 1900 may hereby, in some examples, comprise in particular using the process chamber according to the example implementations generally as described herein.

Even in SLM systems with large construction sites and without a direct machine housing, laser safety or generally radiation safety may need to be guaranteed and any danger/hazard to humans from released (laser) radiation may need to be excluded. At the same time, however, access to the process room may need to be guaranteed in order to be able to enter the work area in the event of any malfunctions or even as planned.

Example implementations are described herein which allow for detecting an opening (authorized or unauthorized) of a structurally shielded process/work area and/or detecting a change in the position (and/or orientation) of the process chamber relative to the powder bed, which may result in a person being endangered by, for example, free laser radiation (due, for example, to lifting from the powder bed and/or tilting of the process chamber relative to the processing plane). Based on this detection, for example, laser release from the laser(s) may be locked or a complete shutdown of the laser(s) may be carried out.

Example implementations described herein relate to safety (control) devices for manufacturing systems and sites in which the process chamber (as outlined above) is freely movable and either there is no structural shielding of the environment or, in the case of a structural shielding, the access of a person to the interior room must be protected against, for example, free laser radiation.

In the case of a structural shielding of the process area to the environment, for example by a separate room, a flexible chamber or a bellow, the internal pressure can be monitored and, in case of a pressure drop when the shielding is being opened (authorized or unauthorized), the laser(s) can be switched off or the laser release can be withheld.

FIG. 20 shows a schematic illustration of a safety setup according to some example implementations as described herein.

As can be seen, the mobile production unit is arranged on a manipulator, in this example, a robotic arm. The entire arrangement is placed within an enclosure 2002. The pressure inside the enclosure 2002, denoted as $p_1$ is x, which is larger than the pressure outside the enclosure 2002, which is denoted as $p_0$.

In this example, the arrow on the bottom left-hand side of the upper drawing of FIG. 20 indicates a constructional sealing insofar that the enclosure 2002 is closed. The large arrow in the middle part of FIG. 20 indicates that the enclosure 2002 is then opened, as shown in the lower drawing of FIG. 20. As a result, the pressure $p_1$ decreases, resulting in one or both of the laser being shut down and the robotic arm movement being stopped (or otherwise influenced to, for example, limit the extent of movement). The decrease of $p_1$ is due to gas exiting the enclosure 2002 from the interior of the enclosure to the outside of the enclosure.

Additionally or alternatively to the pressure monitoring described above, a door switch (for example pushbutton switch and/or magnetic switch) may be provided, wherein upon the switch being activated or another condition of the switch changing results in one or both of the laser being shut down and the robotic arm movement being stopped (or otherwise influenced to, for example, limit the extent of movement).

As outlined above, the robotic arm movement may be stopped (or otherwise influenced to, for example, limit the extent of movement) depending on a certain condition being satisfied. Therefore, in addition, the movement of one or more industrial robots can be coupled to the safety (control) device, whereby, for example, movements in the room of the one or more robots may be restricted and/or slowed down.

In addition or alternatively, for example, if no structural shielding is provided, the distance between the process chamber (mobile production unit) and the powder bed can be monitored by at least one sensor and a lifting of the process chamber from the powder bed can be detected. The laser or lasers may then be switched off so that no free laser radiation enters the environment.

This is depicted in FIG. 21 which generally shows a mechanism for preventing laser light from entering the environment upon the process chamber being tilted. In this example, tilting of the process chamber with respect to a build layer is detected based on distance sensors sensing that a distance from a first side of the process chamber to the build layer is no longer identical to a distance of the process chamber from another side of the process chamber to the build layer. In this example, the sensors are hereby arranged on opposing sides of the process chamber at a substantially same height on the process chamber. As will be appreciated, alternatively, the sensors may be arranged at different heights on the process chamber at different sides thereof, and, upon tilting of the process chamber, the change in distance from one of the sensors to the build layer is different compared to the change in distance from the other sensor to the build layer, which allows detecting tiling of the process chamber. Other possibilities will be known to those skilled in the art.

The sensor(s) mentioned above may monitor the distance inductively and/or capacitively and/or based on a running time of a signal (for example an ultrasound signal). The sensor(s) described above may be positioned outside and/or inside the process chamber.

In some examples, the monitoring described above may be combined with a query of the position of the deflection unit(s) of the laser(s) from which, together with the position of the end effector, it can be calculated whether laser radiation or reflections could escape in this position.

FIG. 22 shows such an arrangement in which, based on the deflection of the laser beam from the build layer, it may be determined as to whether the radiation may be able to exit the process chamber. As shown, this functionality may be combined with the distance sensors described above. The combination with any one or more of the safety mechanisms may be used.

In examples in which the internal pressure in the process chamber is monitored, this pressure monitoring may be performed based on one or more sensors which are used to monitor the area (for example within the enclosure and/or the process chamber) for leakage, so that the sensor values could be used for a safety circuit.

The use of one or more sensors—a single sensor which detects a change of distance of the process chamber to the build layer may equally be used to detect that the process chamber is no longer covered or generally covered by the build layer) to monitor the distance/position/orientation of the process chamber may allow the robot-based production of large components without a laser protection cabin or similar laser-safe structural shielding, which saves the cost of such an enclosure and allows greater flexibility in terms of workpiece size. In addition, if a complete enclosure of the entire working area is omitted, powder removal and further transport of the workpiece may be greatly simplified.

In addition, when using one or more sensors directly at the process chamber in a multi-robot setup, only the one or more lasers of the process chamber that are not in the correct position can be selectively switched off, so that productivity would only be minimally restricted.

Given that the mobile production unit/process chamber used in the additive manufacturing process as described herein is movable by a manipulator, such as a robotic arm, the apparatus allows for producing additive workpieces having a large volume, while at the same time ensuring high flexibility in relation to the production arrangement.

Challenges associated with the implementation of this concept include ensuring process accuracy that meets the requirements of, in particular, laser beam melting. With currently common layer heights of, for example, 50 µm, tolerances may occur in the layer-dependent positioning of the manipulator (for example robot) or the production unit mounted on it, which may have a negative influence on the production result.

Example implementations described herein allow positioning the manipulator before or during the additive manufacturing process with the mobile production unit. In the process flow, the correct build-up of the starting layer at the correct position in the layer plane and at the correct build-up height directly above the substrate plate (carrier) should, in some examples, take place first. In, for example, even distances (for example after a number of n layers), a position correction or calibration of the mobile production unit may need to be carried out again by the positioning system as described herein. The latter may be necessary if, for example, temperature fluctuations or other error variables may need to be compensated.

A procedure for positioning the manipulator (for example robot), or the mobile production unit mounted on it, is described, whereby positioning may be performed, in some examples, during the additive manufacturing process. Compared in particular to optical systems, comparatively more cost-effective tactile measuring systems may hereby take over these position checking and position correction tasks.

FIG. 23 shows a schematic illustration of a cross-sectional side view of a positioning system 2300 according to some example implementations as described herein.

In this example, the positioning system 2300 comprises robots 2302 which are coupled to respective mobile production units 2304. It will be appreciated that the positioning system may also be used in a system with only one, or a different number of robots/mobile production units.

Furthermore, in this example, multiple measuring sensors 2306 are arranged on each of the mobile production units 2304. Reception means 2308 for receiving the measuring sensors 2306 are provided on each of the mobile production units 2304.

Positioning units 2310 are arranged, in this example, at defined positions of an edge region of the carrier (substrate plate 2316). The positioning directions 2312 relating to the respective positioning units 2310 are indicated by the vertical arrows.

For illustrative purposes, the pulverulent material 2314 as well as different workpiece layers 2318 are also depicted in FIG. 23.

In this example, two mobile production units are shown at a time m, which are located in the process sequence shown before exposure of the next layer n. Before the layer n is exposed, at this point in the manufacturing process, the production units may move to respective positioning units in order to check the correct absolute position of the production units and, if necessary, correct the values of these absolute positions. For this purpose, positioning units are arranged on one side at the edge zones of the substrate plate.

The distribution or number of these positioning units depends, for example, on the accessibility of these with the mobile production unit. It may need to be ensured, in some examples, that at least one positioning unit can be reached at a given point in time by a manipulator (e.g. robot). When optimizing travel paths of the mobile production unit, however, this number may, in some examples, increase significantly. It may also need to be taken into account that the mobile production units do not block each other's traverse paths during the positioning process.

As will be appreciated, the mobile production units may not undergo the positioning/correction procedure simultaneously, but at different points in time.

Measuring sensors are arranged directly on the production unit in this example in three spatial directions (according to a Cartesian coordinate system) and form the counterpart to the positioning unit.

FIG. 24 shows a schematic illustration of a top view of an arrangement of the positioning system 2300 according to some example implementations as described herein.

In FIG. 24, a driverless transport system 2402, positioning axes 2404 of the respective robots and the positioning directions 2406 of the driverless transport system and the robots are also shown.

As can be seen from FIGS. 23 and 24, in this variant, the positioning unit is, in this example, composed of individual plates manufactured with high precision and perpendicular to each other. This arrangement is, in this example, open to the top and to two sides along the layer plane so that the measuring sensors (mounted on the mobile production unit) that travel to the positioning unit(s) can be positioned. By, for example, a tactile contact (either simultaneously or individually) of at least one measuring sensor to the opposite wall of the positioning unit, at least one absolute value can be determined and, if necessary, a position correction (for example in the case of deviations from a correct initial value) can be performed. In case of inclination errors of the mobile production unit, three measuring sensors arranged in three spatial directions may preferably be used in order to check and, if necessary, correct the inclination settings.

Furthermore, it is conceivable that the positioning units may be mounted on a high-precision spindle so that they may be moved in the build direction of the workpiece. For example, one or more of these positioning units may be moved according to the progress of the process for manufacturing the three-dimensional workpiece. This may be preferred, for example, if a position deviation may only be expected in the mounting direction and, if necessary, a correction of the position deviations within a layer is to be carried out in another way (for example position correction via other process components). After such a position correction, the manipulator (for example robot) may, in some examples, move in a circular path (starting from the positioning unit) to a defined position to expose the layer of material for supplying and/or solidifying the material to produce the workpiece. With a serial kinematic structure of the manipulator, a smaller number of axes to be moved simultaneously may be needed, in some examples, for this movement form, whereby position errors (for example based on tolerances) may be reduced.

The positioning system therefore allows for supplying, using the mobile production unit/process chamber, and/or solidifying the material with high quality based on a well-defined position determination and/or correction of the mobile production unit/process chamber (which is attached to the manipulator). This may allow more efficiently supplying and/or solidifying the material, while maintaining high quality of the produced workpiece.

In particular in multi-material laser beam melting, the use of a powder preparation step to be carried out after the manufacturing process (separation of the mixed powder from the process) may be largely or completely avoided by using the process including the use of the positioning system as described above.

As outlined above in relation to various example implementations, a mobile production unit (for example comprising or being integral to a process chamber) may be moved via a manipulator, such as an industrial robot. The mobile production unit may hereby be attached to the end effector (for example last kinematic member of the robot).

In addition to the optics for beam shaping and deflection, the mobile production unit may also include the material (for example powder) supply unit. The position of the mobile production unit relative to the powder bed surface may determine the intensity of the laser radiation on the powder bed as well as the height of the applied powder layer. Even deviations of a few μm or a tilting of a few degrees may lead to significant deviations in workpiece quality.

However, since absolute positioning accuracy of the robot may not be sufficient to maintain the exact position of the mobile production unit relative to the powder bed, it may, in some examples, be necessary to record and control the position using external measuring devices.

Example implementations as described herein may be used in order to define a reference coordinate system for any number of robots in order to increase positioning accuracy of the mobile production unit.

Example implementations as described herein are based on the generation of reference planes and/or lines using, for example, laser radiation. These planes and/or lines are detected by detectors and the relative position to the mobile production unit may be determined. Using this information, the position of the mobile production unit or the scan field may be corrected, in some examples, by means of a closed-loop control.

In the following, examples for generating and using the reference plane and lines are described.

FIG. 25 shows a schematic illustration of a system 2500 for generating a reference plane for position determination according to some example implementations as described herein.

The reference plane is, in this example, always parallel to the powder bed surface. In this example, the plane is generated by a laser 2502 with appropriate optics to generate a linear beam profile. Another possible design for generating the reference plane may be the beam deflection of a punctiform laser beam to a line by means of a polygon scanner.

The laser 2502 generates, in this example, a laser light section 2504, which may be detected, in this example, by detectors 2508 and 2510, which are, in this example, arranged on the mobile production unit 2506.

The laser beam 2512 is detected, in this example, by detectors 2508 and 2510 at a certain height, h, above zero level 2518 (at which level the material layer to be processed in order to produce the three-dimensional workpiece may be arranged). The focus 2514 of the laser beam on the detector level and the tilting 2516 of the mobile production unit 2506 relative to the reference plane are indicated.

The height of the reference plane above the powder bed may, as outlined above, be variable so that its position may represent the target position of the powder layer.

The relative position of the reference plane and the mobile production unit may, in some examples, be continuously detected by means of suitable detectors at the mobile production unit. For example, CCD chips or position sensing devices (PSDs) may be used as detectors.

The positioning of the mobile production unit may be carried out, in some examples, in two steps: it may be assumed that positioning accuracy of the robot is sufficient to bring the reference plane into the visible range of the detectors (this may be, in some examples, a rectangular surface with an edge length of, for example, about 5-10 mm). If the reference plane is detected, the fine positioning may take place via a closed-loop control with the relative position between the reference plane and the mobile production unit as a control parameter.

The position may be corrected either by a movement of the building chamber and/or by a coordinate transformation of the scan field. If the reference plane is detected by more than one detector, in addition to the position along the z-axis, the tilting of the mobile production unit about the corresponding axis may be calculated from the relative position of the reference plane in the spatial coordinate system of the detectors (see right-hand side of FIG. 25).

If more than one mobile production unit is used, it may, in some examples, need to be ensured that acquisition of the reference plane is not disturbed by another mobile production unit.

FIG. 26 shows a schematic illustration of an arrangement 2600 of reference planes according to some example implementations as described herein. The arrangement 2600 may hereby be used in order to simultaneously generate multiple reference planes.

In this example, a first reference plane 2608 and a second reference plane 2610 are generated for a first robot 2602, a second robot 2604 and a third robot 2606. The shadowing of the reference planes by the objects present in the respective beams is not shown in FIG. 26.

Detectors 2508 are arranged, in this example, on top of the mobile production units (at the end portion of the robots).

FIGS. 27a and b show schematic illustrations of an arrangement 2700 of reference lines according to some example implementations as described herein.

In FIG. 27a, the detector 2508 is arranged on the mobile production unit 2506, so that the positioning may take place in the x-y-plane. The mobile production unit 2506 is hereby moved via the robot 2702 over the construction plane 2704. Linear axes 2708 are, in this example, defined via a stand 2710, whereby the linear axes 2708 are used for defining the reference line 2706.

Figure 27B:
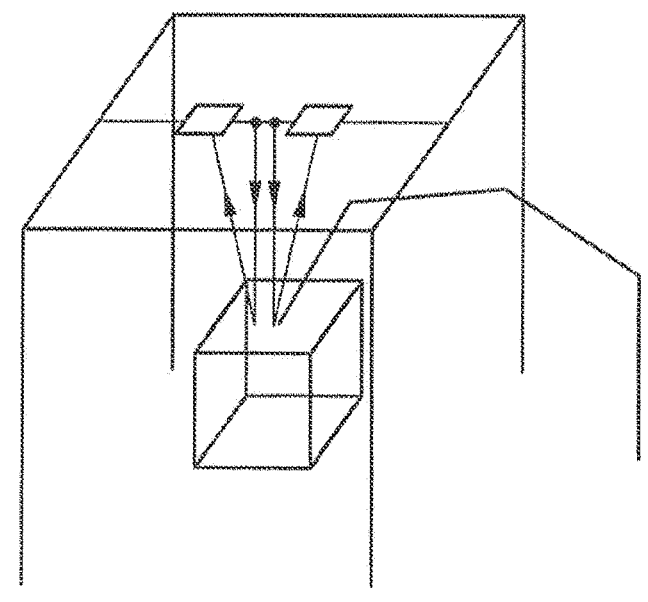

In FIG. 27b, two or more detectors are arranged on the linear axis and receive, in this example, the laser radiation (or other type of radiation) reflected at a fixed angle. By shifting the position of the laser beam when impinging on the detector, the position, the distance and the tilting along the x-y-plane may be determined.

As can be seen from the examples shown in FIGS. 27*a* and *b*, the laser beam sources for the reference lines may be moved along any x-y-z axes combination using a combination of linear axes. The examples in FIGS. 27*a* and *b* show motion kinematics that allows movement along the x-y-plane. Positioning accuracy of the reference lines may hereby, in some examples, need to be sufficiently high, since the focus 2514 of the laser beam on the detector level may represent the target position.

In FIG. 27*a*, the laser beam source is mounted movably on the linear axes and the detector is located on the mobile production unit. With this setup, it may be possible to determine the position deviation in the x-y-plane.

As outlined above, FIG. 27*b* shows the detector together with the laser beam source on the linear axis. The laser beam is reflected, in this example, by a suitable optical element at a fixed angle from the mobile production unit towards the detector. By using two or more beam source-detector combinations, the relative displacement of the beam on the detector can be compared to the tilting of the mobile production unit along the x-y-axes and the distance of the mobile production unit to the detector.

Any combination of the solutions described herein is possible to determine the position of the mobile production unit.

Example implementations of the system/apparatus in which one or more reference planes and/or lines are used may be advantageous in particular over camera-based systems. In camera-based systems, accuracy decreases with increased distance from the sensor. Positioning is therefore usually not sufficiently accurate in camera-based systems. Example implementations of the system/apparatus as described herein in which one or more reference planes and/or lines are used may also be advantageous in particular over laser-tracker systems, as the latter are comparatively expensive, whereby for accurate determination of the position of robots, four trackers are currently necessary in laser-tracker systems.

Advantageously, acquisition of the measured variable as well as the control is comparatively simple in example implementations of the system/apparatus as described herein in which one or more reference planes and/or lines are used; the integration of several robot systems is also easily achievable compared to other position determination systems.

FIG. 28 shows a top view of a schematic illustration of an apparatus 2800 according to some example implementations as described herein.

In this example, the apparatus 2800 comprises two robots 2302*a* and *b*.

Robot 2302*a* comprises, in this example, a solidification unit 2808.

Robot 2302*b* comprises, in this example, a layer supply unit 2812.

Positioning axes 2404 of the robots are depicted in FIG. 28.

A driverless transport system 2402 is provided, on which the robot 2302*b* is arranged. Robot 2302*a* is arranged on a respective driverless transport system. Positioning directions 2406 of the driverless transport systems are indicated.

In this example, the apparatus 2800 further comprises a process gas duct (or channel) 2810 via which process gas (for example shielding gas) may be provided to the construction area in which the three-dimensional workpiece is produced.

In this example, the powder layer n (2802), an already solidified layer n of the workpiece (2804), and a powder layer n+1 (2806) are shown in FIG. 28.

Other combinations of functioning of the different units depicted in FIG. 28 are possible. For example, a first mobile production unit comprises a solidification device adapted to produce solidified material layers on the carrier in order to produce the workpiece by an additive layer construction method, a second and/or a third and/or a fourth mobile production unit comprises a material supply unit adapted to supply the material to the carrier and/or the solidification device, wherein the second and/or the third and/or the fourth mobile production unit comprises a gas supply system adapted to supply a shielding gas to an area that is to be irradiated by the solidification device, and wherein the second and/or the third and/or the fourth mobile production unit comprises a layer depositing mechanism for forming the supplied material into a material layer on top of the carrier, wherein the second, third and fourth mobile production units do not comprise a said solidification device. Other combinations are possible.

FIG. 29 shows a cross-sectional side view of a schematic illustration of an apparatus 2900 according to some example implementations as described herein.

In this example, the apparatus 2900 comprises two robots with a first robotic arm 2908 and a second robotic arm 2906, respectively.

In this example, the apparatus 2900 further comprises a particle collector 2910.

The first mobile production unit comprises, in this example, a coupling module 2912 in order to couple the robotic arm 2908 to a solidification unit 2808*a* and a layer supply/depositing unit 2812*a*. The second mobile production unit comprises, in this example, a coupling module 2904 in order to couple the robotic arm 2906 to a solidification unit 2808*b* and a layer supply/depositing unit 2812*b*.

The solidification units 2808*a* and *b* may hereby be radiation units.

In FIG. 29, radiation beams 2902, solidified layers 2318, a substrate plate 2316, powder material 2314, and a process gas stream 2914 are also shown.

The following examples are also encompassed by the present disclosure and may fully or partly be incorporated into embodiments.

1. A process chamber for producing a three-dimensional workpiece via an additive layer construction method, the process chamber comprising:

a material supply unit comprising a substantially ring-like shaped end portion at a first side of the process chamber, wherein the material supply unit is adapted to supply, via the end portion, material to a carrier on which the material is to be processed by the process chamber for producing the three-dimensional workpiece, and an opening at the first side of the process chamber for processing, by the process chamber, the material supplied on the carrier in order to produce the three-dimensional workpiece, wherein the substantially ring-like shaped end portion surrounds the opening.

2. A process chamber according to clause 1, wherein the material supply unit comprises a bell-like shaped structure through which the material is suppliable to the carrier, and wherein the end portion forms an end part of the bell-like shaped structure.

3. A process chamber according to clause 1 or 2, wherein the process chamber comprises a multi-wall structure, and wherein a first cavity formed between a first wall and a second wall of the multi-wall structure is comprised in or coupled to the material supply unit.

4. A process chamber, in particular according to clause 3, for producing a three-dimensional workpiece via an additive layer construction method, the process chamber comprising a gas extraction unit and/or gas introduction unit, wherein a second cavity is formed between a third wall and a fourth wall of the multi-wall structure, wherein the second cavity is arranged radially outwards from the first cavity in a direction away from a center portion of the process chamber, and wherein the second cavity is comprised in or coupled to the gas extraction unit and/or gas introduction unit which is configured to extract and/or introduce gas from the center portion of the process chamber.

5. A process chamber according to clause 4, when dependent from clause 3, wherein the second wall is integral to the third wall.

6. A process chamber according to any one of clauses 3 to 5, wherein a third cavity is formed between a fifth wall and a sixth wall of the multi-wall structure, and wherein process gas is introducible into and/or extractable out of the process chamber via the third cavity.

7. A process chamber according to any preceding clause, further comprising a solidification device adapted to solidify the material supplied to the carrier for producing the three-dimensional workpiece.

8. A process chamber according to clause 7, wherein the solidification device is offset from a center axis of the process chamber, wherein the center axis is defined as being perpendicular to a plane defined by the opening of the process chamber and running through a central point of the opening.

9. A process chamber according to any preceding clause, further comprising a layer depositing mechanism arranged at the first side of the process chamber and adapted to form the supplied material into a material layer on top of the carrier.

10. A process chamber according to clause 9, when dependent from clause 3, wherein the layer depositing mechanism is arranged adjacent to and radially inwards from the first cavity for controlling, via the layer depositing mechanism, supplying the material to the carrier via the first cavity.

11. A process chamber according to any preceding clause, further comprising a first seal arranged at the first side of the process chamber and between the end portion and the opening for producing, in use of the process chamber, a first gas vortex.

12. A process chamber according to clause 4, or any one of clauses 5 to 11 when dependent from clause 4, further comprising a second seal arranged at the first side of the process chamber and radially outwards from the second cavity.

13. A process chamber according to any preceding clause, further comprising a third seal arranged at the first side of the process chamber and radially outwards from the end portion of the material supply unit for producing, in use of the process chamber, a second gas vortex.

14. A process chamber according to any preceding clause, wherein the material supply unit comprises a material feed geometry which is adapted to homogeneously distribute, in the end portion, the material to be supplied to the carrier.

15. A process chamber according to any preceding clause, further comprising a ring-like shaped sieve coupled or integral to the material supply unit, wherein the sieve is adapted to homogeneously distribute, in the end portion, the material to be supplied to the carrier.

16. A process chamber according to clause 3, or any one of clauses 4 to 15 when dependent from clause 3, wherein the first cavity comprises a segmentation for providing different material via different sections of the end portion to the carrier.

17. A process chamber according to clause 16, wherein a section of the different sections of the end portion from which the material is suppliable to the carrier is dependent from a direction of movement of the process chamber over the carrier.

18. A process chamber according to clause 16 or 17, wherein a first material having particles of a first size is suppliable to the carrier via a first section of the different sections and a second material having particles of a second size, which is different from the first size, is suppliable to the carrier via a second section of the different sections, wherein the second section is different from the first section.

19. A process chamber according to any preceding clause, further comprising:
   a process gas introduction unit and a process gas extraction unit arranged oppositely of each other at the first side of the process chamber for introducing and extracting process gas into and out of the process chamber, respectively, and
   a moving mechanism adapted to change a position of the process gas introduction unit and the process gas extraction unit at the first side of the process chamber.

20. A process chamber according to clause 19, further comprising a substantially circular structure comprising recesses, wherein the structure is arranged radially inwards from the process gas introduction unit and the process gas extraction unit towards a center portion of the process chamber, and wherein the structure comprising recesses is adapted to guide the process gas from the process gas introduction unit to the process gas extraction unit.

21. A process chamber according to clause 20, further comprising substantially semi-circular segments configured to cover the recesses at positions where the process gas is prevented from entering an interior portion of the process chamber.

22. A process chamber according to any preceding clause, further comprising a particle collector adapted to collect particles of the material supplied on the carrier, but which particles are not comprised in the three-dimensional workpiece to be produced.

23. A process chamber according to clause 22, when dependent from any one of clauses 19 to 21, wherein the particle collector is arranged adjacent to and radially inwards from the process gas extraction unit.

24. A process chamber according to any one of clauses 19 to 21, or clause 22 or 23 when dependent from clause 19, further comprising a process gas filter (i) arranged adjacent to and radially inwards from the process gas extraction unit and/or (ii) integral to the process gas extraction unit.

25. A process chamber, in particular according to any preceding clause, for producing a three-dimensional workpiece via an additive layer construction method, the process chamber comprising a heating unit arranged (i) within an interior portion of the process chamber and/or (ii) contiguously to or adjacent to the ring-like shaped end portion of the material supply unit radially inwards and/or radially outwards from the ring-like shaped end portion of the material supply unit,
   wherein the heating unit is adapted to heat up the material supplied on the carrier.

26. A process chamber according to clause 25, wherein the heating unit has a substantially circular shape.

27. A process chamber according to clause 25 or 26, wherein the heating unit is coaxially aligned with a center axis of the process chamber, wherein the center axis is defined as being perpendicular to a plane defined by the opening of the process chamber and running through a central point of the opening.

28. A process chamber according to any one of clauses 25 to 27, wherein the heating unit is movable within the interior portion of the process chamber.

29. A process chamber according to any preceding clause, further comprising one or more ducts for arranging one or more sensors at a periphery of the process chamber for obtaining processing parameters during use of the process chamber to produce the three-dimensional workpiece.

30. An apparatus for producing a three-dimensional work-piece via an additive layer construction method, the apparatus comprising:

a carrier adapted to receive material for producing the three-dimensional workpiece via the additive layer construction method;

the process chamber according to any one of the preceding clauses; and a moving unit adapted to move the process chamber relative to the carrier to position the process chamber oppositely to different sections of the carrier.

31. An apparatus according to clause 30, comprising:

the process chamber of clause 29, and the one or more sensors which are adapted to sense a position of the process chamber relative to the carrier, wherein the apparatus is adapted to generate a sensor signal based on the sensed position of the process chamber relative to the carrier, and wherein the moving unit is adapted to move the process chamber relative to the carrier based on the sensor signal.

32. A modular system for use with the process chamber according to any one of clauses 1 to 29 or the apparatus according to clause 30 or 31, wherein the modular system comprises:

a base module comprising one or more first elements on a surface of the base module;

one or more substrate modules for receiving, on a first surface of a said substrate module, material to be processed for producing a three-dimensional workpiece via an additive layer construction method, wherein a said substrate module comprises one or more second elements on a second surface of the substrate module, wherein the first surface is opposite to the second surface, wherein a said second element is shaped to mate with a said first element of the base module for a temporary fixation of the base module with the one or more substrate modules; and one or more modular elements for (i) supporting the material when being received by the one or more substrate modules and/or (ii) confining the material in an area on the one or more substrate modules and/or (iii) supporting the substrate module, wherein a said modular element comprises one or more third elements, wherein a said third element is shaped to mate with a said first element of the base module for a temporary fixation of the one or more modular elements on the base module.

33. A modular system according to clause 32, wherein the base module and/or the one or more substrate modules comprise one or more sealable openings for receiving the one or more modular elements, and wherein the one or more modular elements are raisable for said supporting of the material and/or said confining of the material and/or supporting of the one or more substrate modules depending on a state of said producing of the three-dimensional workpiece via the additive layer construction method.

34. A modular system according to clause 32 or 33, comprising a first and a second said base module, wherein the first base module comprises a base module protrusion and the second base module comprises a base module recess shaped to mate with the base module protrusion for temporarily fixing the first base module and the second base module to each other.

35. A method for producing a three-dimensional work-piece via an additive layer manufacturing technique, the method comprising:

providing a modular system according to any one of clauses 32 to 34;

arranging the one or more substrate modules on one or more locations of the base module dependent on where material is to be processed based on a shape of the three-dimensional workpiece to be produced;

providing the material on the one or more substrate modules, in particular using the process chamber according to any one of clauses 1 to 29 or the apparatus according to clause 30 or 31; and processing the material to produce the three-dimensional workpiece via the additive layer manufacturing technique.

36. A method according to clause 35, further comprising providing the one or more modular elements on one or both of (i) one or more of the one or more first elements of the base module and (ii) one or more of the one or more substrate modules to:

support the material when being provided on the one or more substrate modules, and/or confine the material, when being provided on the one or more substrate modules, in an area on the one or more substrate modules, and/or support a said substrate module for subsequently receiving the material by the substrate module.

37. A method according to clause 35 or 36, further comprising arranging a said modular element on top of a previously arranged modular element dependent on an increased building height of the three-dimensional work-piece produced via the additive layer manufacturing technique.

38. A method according to any one of clauses 35 to 37, further comprising providing a displacement material, prior to providing the material from which the three-dimensional workpiece is produced, in a predefined volume confined by the modular system.

39. A safety device for use with the process chamber according to clause 7 or 8, wherein the safety device comprises:

a sensor adapted to sense a state of the process chamber and/or of an enclosure in which the process chamber is arranged, and a control unit adapted to control the solidification device, wherein the control unit is coupled to the sensor, and wherein the control unit is adapted to prevent releasing radiation and/or particles stemming from the solidification device and/or to switch off the solidification device upon the sensor sensing that the state satisfies a predefined condition.

40. A safety device according to clause 39, wherein the predefined condition comprises the opening of the process chamber not being covered.

41. A safety device according to clause 40, wherein the opening of the process chamber not being covered comprises the process chamber being lifted and/or an orientation of the process chamber changing relative to the carrier.

42. A safety device according to any one of clauses 39 to 41, wherein the sensor comprises an accelerometer.

43. A safety device according to any one of clauses 39 to 42, wherein the sensor comprises a pressure sensor adapted to sense a pressure change in the enclosure in which the process chamber is arranged, and wherein the predefined condition comprises the pressure change.

44. A safety device according to any one of clauses 39 to 43, further comprising a door switch coupled to the control unit, wherein the door switch is adapted to detect when a door of the enclosure in which the process chamber is arranged is open, and wherein the predefined condition comprises the door being open.

45. A safety device according to clause 44, wherein the control unit is coupleable to a robotic device operating within the enclosure, and in particular coupleable to the moving unit according to clause 30 or 31, wherein the control unit is adapted to control or affect a movement or movement capability of the robotic device, and in particular the moving unit, upon the door switch detecting that the door of the enclosure is open.

46. A safety device according to any one of clauses 39 to 45, wherein the sensor comprises a distance sensor adapted to determine a distance between the process chamber and the carrier, and wherein the predefined condition comprises exceeding a minimum distance between the process chamber and the carrier upon which the control unit prevents releasing radiation and/or particles stemming from the solidification device and/or switches off the solidification device.

47. A safety device according to any one of clauses 39 to 46, further comprising a processing unit adapted to determine when, based on a reflection of the radiation stemming from the solidification device off the carrier, the radiation can exit from a volume confined by the process chamber, and wherein the predefined condition comprises the radiation being able to exit said volume.

48. A safety device according to any one of clauses 39 to 47, wherein the sensor is arranged on the process chamber.

49. A positioning system for determining and/or correcting a position of a mobile production unit, in particular the process chamber according to any one of clauses 1 to 29, relative to a carrier adapted to receive material to be processed by the mobile production unit, wherein the positioning system comprises:

one or more positioning units adapted to be arranged at defined positions of an edge region of and/or within a predefined distance from the carrier; and one or more measuring sensors adapted to be arranged on the mobile production unit and/or at defined locations with respect to the mobile production unit;

wherein a said positioning unit and a said measuring sensor are shaped to receive each other, and wherein the position of the mobile production unit is determinable and/or correctable by the positioning system based on the measuring sensor being arranged on the mobile production unit and being received at the positioning unit at a said defined position.

50. A positioning system according to clause 49, wherein a said positioning unit comprises three plates, each of the plates being arranged perpendicularly to both of the other plates to form an arrangement with two open sides and an open top, and wherein the position of the mobile production unit is determinable and/or correctable based on one or more of the measuring sensors contacting respective one or more plates of a said positioning unit.

51. A positioning system according to clause 49 or 50, configured to determine an inclination of the mobile production unit relative to the carrier based on three measuring sensors contacting corresponding, respective plates of a said positioning unit.

52. A positioning system according to any one of clauses 49 to 51, wherein the one or more positioning units are raisable in a direction perpendicular to a said carrier.

53. A system comprising:

a positioning system according to any one of clauses 49 to 52; and a said mobile production unit, wherein the mobile production unit comprises a solidification device;

wherein, once the position of the mobile production unit is determined and/or corrected, the mobile production unit is adapted to perform a substantially circular movement in a plane parallel to the carrier from a said positioning unit to a predefined position at which the material is to be supplied by the mobile production unit and/or processed by the solidification device.

54. A system comprising:

a mobile production unit, in particular comprising the process chamber according to any one of clauses 1 to 29, the mobile production unit being adapted to produce a three-dimensional workpiece via an additive layer construction method;

a moving unit coupled to the mobile production unit and adapted to move the mobile production unit;

a light source adapted to generate one or more light beams for a reference line and/or a reference plane serving as a reference for a position and/or orientation of the mobile production unit; and one or more light detectors, in particular laser radiation detectors, arranged on or coupled to (i) the mobile production unit and/or (ii) an enclosure in which the mobile production unit is arranged;

wherein the light detectors are adapted to detect the one or more light beams, and wherein the system is adapted to determine, based on the light detectors detecting the one or more light beams, the position and/or the orientation of the mobile production unit relative to the reference line and/or the reference plane.

55. A system according to clause 54, wherein the system is adapted to alter, based on the moving unit moving the mobile production unit, the position and/or the orientation of the mobile production unit relative to the reference line and/or the reference plane based on said determination.

56. A system according to clause 54 or 55, wherein the system is adapted to perform a coordinate transformation in relation to the solidification device used for producing the three-dimensional workpiece via the additive layer construction method based on said determination.

57. A system according to any one of clauses 54 to 56, wherein the light source comprises a laser light source for generating a linear laser beam profile.

58. A system according to clause 57, further comprising a polygon scanner adapted to generate the reference line and/or the reference plane from the linear laser beam profile.

59. A system according to any one of clauses 54 to 58, comprising a plurality of mobile production units, wherein the system is adapted to generate the light beams for a plurality of reference planes.

60. A system according to any one of clauses 54 to 59, wherein the light source and/or the one or more light detectors are movable in three dimensions.

61. A system according to any one of clauses 54 to 60, wherein, when the plurality of light detectors are arranged on or coupled to the enclosure, the determination of the position and/or orientation of the mobile production unit relative to the reference line or reference lines is based on a reflection of the one or more light beams from the mobile production unit towards the light detectors.

62. An apparatus for producing a three-dimensional workpiece, the apparatus comprising:

a carrier adapted to receive material for producing the three-dimensional workpiece;

a plurality of mobile production units, in particular each comprising the process chamber according to any one of clauses 1 to 29, wherein a first said mobile production unit comprises a solidification device adapted to produce solidified material layers on the carrier in order to produce the workpiece by an additive layer construction method, wherein a second and/or a third and/or a fourth said mobile production unit comprises a material supply unit adapted to supply the material to the carrier and/or the solidification device, wherein the second and/or the third and/or the fourth mobile production unit comprises a gas supply system adapted to supply a shielding gas to an area that is to be irradiated by the solidification device, and wherein the second and/or the third and/or the fourth mobile production unit comprises a layer depositing mechanism for forming the supplied material into a material layer on top of the carrier;

wherein the second, third and fourth mobile production units do not comprise a said solidification device;

wherein the apparatus further comprises:

a plurality of moving units, wherein each of the moving units is adapted to move a corresponding, respective mobile production unit relative to the carrier to position the mobile production unit oppositely to different sections of the carrier.

63. An apparatus according to clause 62, further comprising:

a sensing unit adapted to generate sensor signals relating to a relative arrangement of the mobile production units and the carrier; and a control unit configured to, in addition to the positioning of the mobile production units via the moving unit, provide at least one fine positioning function to compensate for an offset from a desired relative arrangement of the mobile production units and the carrier based on the sensor signals generated by the sensing unit.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. An apparatus for producing a three-dimensional workpiece via an additive layer construction method, the apparatus comprising:

a carrier adapted to receive material for producing the three-dimensional workpiece;

a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, the solidification device comprising a laser and/or a particle source, and the solidification device comprising a beam steering optic comprising one or more deflectable mirrors, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of:

a gas flow device adapted to form a flow of the shielding gas or a flow of a process gas, with the flow above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber, the process chamber further comprising the material supply unit;

the material supply unit comprising a ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening, wherein the material supply unit comprises a bell-like shaped structure through which the material is suppliable to the carrier, and wherein the end portion forms an end part of the bell-like shaped structure, wherein the process chamber comprises a multi-wall structure, and wherein a first cavity formed between a first wall and a second wall of the multi-wall structure is comprised in or coupled to the material supply unit, the process chamber comprising a gas extraction unit and/or gas introduction unit, wherein a second cavity is formed between a third wall and a fourth wall of the multi-wall structure, wherein the second cavity is arranged radially outwards from the first cavity in a direction away from a center portion of the process chamber, and wherein the second cavity is comprised in or coupled to the gas extraction unit and/or gas introduction unit which is configured to extract and/or introduce the shielding gas or the process gas from the center portion of the process chamber.

2. An apparatus as claimed in claim 1, wherein the layer depositing mechanism is arranged adjacent to and radially inwards from the first cavity for controlling, via the layer depositing mechanism, supplying the material to the carrier via the first cavity.

3. An apparatus as claimed in claim 1, further comprising a second seal arranged at the first side of the process chamber and radially outwards from the second cavity.

4. An apparatus as claimed in claim 1, wherein the first cavity comprises a segmentation for providing different material via different sections of the end portion of the material supply unit to the carrier.

5. An apparatus as claimed in claim 4, wherein a section of the different sections of the end portion of the material supply unit from which the material is suppliable to the carrier is dependent from a direction of movement of the process chamber over the carrier, wherein a first material having particles of a first size is suppliable to the carrier via a first section of the different sections and a second material having particles of a second size, which is different from the first size, is suppliable to the carrier via a second section of the different sections, wherein the second section is different from the first section.

6. An apparatus as claimed in claim 1, wherein, when the process chamber comprises the gas flow device, the gas flow device is arranged at a first side of the process chamber and comprises a process gas introduction unit and a process gas extraction unit arranged oppositely of each other for introducing and extracting process gas into and out of the process chamber, respectively, and wherein the apparatus further comprises a moving mechanism adapted to change a position of the process gas introduction unit and the process gas extraction unit at the first side of the process chamber, and a substantially circular structure comprising recesses, wherein the structure is arranged radially inwards from the process gas introduction unit and the process gas extraction unit towards the center portion of the process chamber, and wherein the structure comprising recesses is adapted to guide the process gas from the process gas introduction unit to the process gas extraction unit.

7. An apparatus as claimed in claim 1, wherein the heating unit is arranged (i) within an interior portion of the process chamber and/or (ii) contiguously to or adjacent to the end portion of the material supply unit radially inwards and/or radially outwards from the end portion of the material supply unit.

8. An apparatus as claimed in claim 1, wherein the positioning system comprises:

one or more positioning units adapted to be arranged at defined positions of an edge region of and/or within a predefined distance from the carrier; and one or more measuring sensors adapted to be arranged on the process chamber and/or at defined locations with respect to the process chamber;

wherein the position of the process chamber is determinable and/or correctable by the positioning system based on one or more signals of the measuring sensor or the measuring sensors.

9. An apparatus as claimed in claim 8, wherein the one or more positioning units are raisable in a direction perpendicular to the carrier, wherein the one or more positioning units comprises a light source adapted to generate one or more light beams for a reference line and/or a reference plane serving as a reference for a position and/or orientation of the process chamber; and wherein the one or more sensors comprise one or more light detectors comprising laser radiation detectors;

wherein the light detectors are adapted to detect the one or more light beams, and wherein the position and/or orientation of the process chamber relative to the reference line and/or the reference plane is determinable and/or correctable by the positioning system based on the light detectors detecting the one or more light beams.

10. An apparatus for producing a three-dimensional workpiece via an additive layer construction method, the apparatus comprising:

a carrier adapted to receive material for producing the three-dimensional workpiece;

a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, the solidification device comprising a laser and/or a particle source, and the solidification device comprising a beam steering optic comprising one or more deflectable mirrors, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of:

a gas flow device adapted to form a flow of the shielding gas or a flow of a process gas, with the flow above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber, the process chamber further comprising the material supply unit;

the material supply unit comprising a ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening, wherein the material supply unit comprises a bell-like shaped structure through which the material is suppliable to the carrier, and wherein the end portion forms an end part of the bell-like shaped structure, wherein the process chamber comprises a multi-wall structure, and wherein a first cavity formed between a first wall and a second wall of the multi-wall structure is comprised in or coupled to the material supply unit, wherein a third cavity is formed between a fifth wall and a sixth wall of the multi-wall structure, and wherein process gas is introducible into and/or extractable out of the process chamber via the third cavity, wherein the solidification device is offset from a center axis of the process chamber, wherein the center axis is defined as being perpendicular to a plane defined by an opening of the process chamber and running through a central point of the opening.

11. An apparatus for producing a three-dimensional workpiece via an additive layer construction method, the apparatus comprising:

a carrier adapted to receive material for producing the three-dimensional workpiece;

a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, the solidification device comprising a laser and/or a particle source, and the solidification device comprising a beam steering optic comprising one or more deflectable mirrors, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of:

a gas flow device adapted to form a flow of the shielding gas or a flow of a process gas, with the flow above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber, the process chamber further comprising the material supply unit;

the material supply unit comprising a ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening, wherein the material supply unit comprises a bell-like shaped structure through which the material is suppliable to the carrier, and wherein the end portion forms an end part of the bell-like shaped structure, further comprising a first seal arranged at the first side of the process chamber and between the end portion of the material supply unit and an opening for producing, in use of the process chamber, a first gas vortex.

12. An apparatus for producing a three-dimensional workpiece via an additive layer construction method, the apparatus comprising:

a carrier adapted to receive material for producing the three-dimensional workpiece;

a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, the solidification device comprising a laser and/or a particle source, and the solidification device comprising a beam steering optic comprising one or more deflectable mirrors, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of:

a gas flow device adapted to form a flow of the shielding gas or a flow of a process gas, with the flow above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber, the process chamber further comprising the material supply unit;

the material supply unit comprising a ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening, wherein the material supply unit comprises a bell-like shaped structure through which the material is suppliable to the carrier, and wherein the end portion forms an end part of the bell-like shaped structure, further comprising a third seal arranged at the first side of the process chamber and radially outwards from the end portion of the material supply unit for producing, in use of the process chamber, a second gas vortex.

13. An apparatus for producing a three-dimensional workpiece via an additive layer construction method, the apparatus comprising:

a carrier adapted to receive material for producing the three-dimensional workpiece;

a material supply unit adapted to supply material to the carrier and/or preceding material layers on top of the carrier, a layer depositing mechanism for forming the supplied material into a material layer on top of the carrier and/or the preceding material layers on top of the carrier, a solidification device adapted to solidify the material supplied to the carrier and/or the preceding material layers on top of the carrier for producing the three-dimensional workpiece, the solidification device comprising a laser and/or a particle source, and the solidification device comprising a beam steering optic comprising one or more deflectable mirrors, a gas supply unit adapted to supply a shielding gas to an area of the material layer that is to be solidified by the solidification device, a process chamber comprising the gas supply unit and the solidification device, a moving unit adapted to move the process chamber relative to the carrier, and a positioning system adapted to determine a position of the process chamber relative to the carrier, wherein the process chamber further comprises one or more of:

a gas flow device adapted to form a flow of the shielding gas or a flow of a process gas, with the flow above a surface of the area of the material layer that is to be solidified by the solidification device, a heating unit adapted to heat up the material supplied on the carrier, and a safety device or part of a safety device adapted to prevent, during operation of the apparatus, release of process emissions to a surrounding of the process chamber, wherein at least one of the gas flow device, the heating unit and the safety device or part of the safety device of the process chamber is adapted to operate independently of a moving direction of the process chamber, the process chamber further comprising the material supply unit;

the material supply unit comprising a ring-like shaped, end portion at a first side of the process chamber, wherein the material supply unit is adapted to supply, via the end portion, the material to the carrier on which the material is to be processed by the process chamber for producing the three-dimensional workpiece, and an opening at the first side of the process chamber for processing the material supplied on the carrier in order to produce the three-dimensional workpiece, wherein the end portion surrounds the opening, wherein the material supply unit comprises a bell-like shaped structure through which the material is suppliable to the carrier, and wherein the end portion forms an end part of the bell-like shaped structure, further comprising a safety control device for use with the process chamber, wherein the safety control device comprises:

a sensor adapted to sense a state of the process chamber and/or of an enclosure in which the process chamber is arranged, and a control unit adapted to control the solidification device, wherein the control unit is coupled to the sensor, and wherein the control unit is adapted to prevent releasing radiation and/or particles stemming from the solidification device and/or to switch off the solidification device upon the sensor sensing that the state satisfies a predefined condition.

14. An apparatus as claimed in claim 13, wherein the predefined condition comprises the opening of the process chamber not being covered.

15. An apparatus as claimed in claim 14, wherein the opening of the process chamber not being covered comprises the process chamber being lifted and/or an orientation of the process chamber changing relative to the carrier, wherein the sensor comprises a pressure sensor adapted to sense a pressure change in the enclosure in which the process chamber is arranged, and wherein the predefined condition comprises the pressure change; and/or wherein the sensor comprises a distance sensor adapted to determine a distance between the process chamber and the carrier, and wherein the predefined condition comprises exceeding a minimum distance between the process chamber and the carrier upon which the control unit prevents releasing radiation and/or particles stemming from the solidification device and/or switches off the solidification device.

* * * * *